US011496422B2

(12) United States Patent
Higgins et al.

(10) Patent No.: US 11,496,422 B2
(45) Date of Patent: Nov. 8, 2022

(54) CONVERSATIONAL BOT EVALUATION AND REINFORCEMENT USING MEANINGFUL AUTOMATED CONNECTION SCORES

(71) Applicant: LIVEPERSON, INC., New York, NY (US)

(72) Inventors: Michael Higgins, New York, NY (US); Akshay Hazare, New York, NY (US); Andrew Maurer, New York, NY (US); Matthew Dunn, Arlington, MA (US); George Bonev, New York, NY (US)

(73) Assignee: LIVEPERSON, INC., New York, NY (US)

( * ) Notice: Subject to any disclaimer, the term of this patent is extended or adjusted under 35 U.S.C. 154(b) by 0 days.

(21) Appl. No.: 17/557,601

(22) Filed: Dec. 21, 2021

(65) Prior Publication Data

US 2022/0200936 A1    Jun. 23, 2022

Related U.S. Application Data

(60) Provisional application No. 63/128,992, filed on Dec. 22, 2020.

(51) Int. Cl.
*H04L 51/02* (2022.01)
*G06N 20/00* (2019.01)
*G06F 11/34* (2006.01)

(52) U.S. Cl.
CPC .......... *H04L 51/02* (2013.01); *G06F 11/3495* (2013.01); *G06N 20/00* (2019.01)

(58) Field of Classification Search
CPC ...... H04L 51/02; G06N 20/00; G06F 11/3495
See application file for complete search history.

(56) References Cited

U.S. PATENT DOCUMENTS

| 10,037,768 | B1 | 7/2018 | Akkiraju et al. |
| 11,121,986 | B2* | 9/2021 | Abitbol ................. G06F 16/335 |
| 2017/0293834 | A1* | 10/2017 | Raison ................ G06F 16/3344 |
| 2018/0183737 | A1* | 6/2018 | Subbarayan .......... H04L 51/216 |
| 2020/0005117 | A1* | 1/2020 | Yuan ....................... G06F 40/30 |
| 2020/0311204 | A1* | 10/2020 | Gupta ...................... G06N 5/04 |
| 2020/0342032 | A1 | 10/2020 | Subramaniam et al. |
| 2020/0342874 | A1* | 10/2020 | Teserra ................... G06F 40/35 |
| 2021/0081972 | A1* | 3/2021 | Sahni .................... G06N 20/00 |

(Continued)

OTHER PUBLICATIONS

International Search Report and Written Opinion dated Mar. 28, 2022 for PCT Application No. PCT/US2021/064565, 11 pages.

(Continued)

*Primary Examiner* — Arvin Eskandarnia
(74) *Attorney, Agent, or Firm* — Polsinelli LLP

(57) ABSTRACT

Disclosed embodiments provide a framework to assist bot managers and builders in identifying particular friction points between bots and customers to allow for real-time identification of bot conversation issues and to train bots to improve conversation flows. Conversation data is processed using machine learning models to detect bot states within conversations and calculate a Meaningful Automated Connection Score (MACS) for these conversations. The MACS for a conversation is provided to bot builders to allow the bot builders to identify friction points and update bots accordingly.

21 Claims, 12 Drawing Sheets

(56) References Cited

U.S. PATENT DOCUMENTS

2021/0090570 A1* 3/2021 Aharoni ............. H04M 3/4286
2021/0160373 A1* 5/2021 McGann ................ G06F 40/35

OTHER PUBLICATIONS

Praveen Kumar Bodigutla et al., "Multi-domain Conversation Quality Evaluation via User Satisfaction Estimation" arxiv.org, Cornell University Library, 201, Olin Library Cornell University, NY Nov. 18, 2019, XP081535918, 11 pages.

* cited by examiner

CONVERSATIONAL BOT EVALUATION AND REINFORCEMENT USING MEANINGFUL AUTOMATED CONNECTION SCORES

CROSS-REFERENCE TO RELATED APPLICATIONS

The present patent application claims the priority benefit of U.S. Provisional Patent Application No. 63/128,992 filed Dec. 22, 2020, the disclosures of which are incorporated by reference herein.

FIELD

The present disclosure relates generally to systems and methods for facilitating evaluation of conversational bots using Meaningful Automated Connection Scores (MACS). More specifically, techniques are provided to deploy a framework to assist bot managers and builders in identifying particular friction points between bots and customers to allow for real-time identification of bot conversation issues and to train bots to improve conversation flows.

SUMMARY

Disclosed embodiments provide a framework to assist bot managers and builders in identifying particular friction points between bots and customers to allow for real-time identification of bot conversation issues and to train bots to improve conversation flows. According to some embodiments, a computer-implemented method is provided. The computer-implemented method comprises receiving conversation data corresponding to a conversation between a conversation bot agent and a customer. The conversation data includes messages exchanged between the conversation bot agent and the customer. The computer-implemented method further comprises calculating a set of features from the conversation data. The computer-implemented method further comprises detecting a set of bot states corresponding to performance of the conversation bot agent in the conversation. The set of bot states is detected based on the set of features and the conversation data. The computer-implemented method further comprises training a machine learning model using sample conversation data and corresponding bot states. The training includes determining a Meaningful Automated Connection Score (MACS) for conversations. The computer-implemented method further comprises providing a MACS for the conversation and the set of bot states. The computer-implemented method further comprises receiving an update to the conversation bot agent and implementing the update to the conversation bot agent. The update is used to train the machine learning model.

In an example, a system comprises one or more processors and memory including instructions that, as a result of being executed by the one or more processors, cause the system to perform the processes described herein. In another example, a non-transitory computer-readable storage medium stores thereon executable instructions that, as a result of being executed by one or more processors of a computer system, cause the computer system to perform the processes described herein.

This summary is not intended to identify key or essential features of the claimed subject matter, nor is it intended to be used in isolation to determine the scope of the claimed subject matter. The subject matter should be understood by reference to appropriate portions of the entire specification of this patent application, any or all drawings, and each claim.

The foregoing, together with other features and examples, will be described in more detail below in the following specification, claims, and accompanying drawings.

Various embodiments of the disclosure are discussed in detail below. While specific implementations are discussed, it should be understood that this is done for illustration purposes only. A person skilled in the relevant art will recognize that other components and configurations can be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others.

The terms used in this specification generally have their ordinary meanings in the art, within the context of the disclosure, and in the specific context where each term is used. Alternative language and synonyms can be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles can be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

The present disclosure is described in conjunction with the appended Figures.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred examples of embodiment(s) only and is not intended to limit the scope, applicability or configuration of the disclosure. Rather, the ensuing description of the preferred examples of embodiment(s) will provide those skilled in the art with an enabling description for implementing a preferred examples of embodiment. It is understood that various changes can be made in the function and arrangement of elements without departing from the spirit and scope as set forth in the appended claims.

Figure 1:
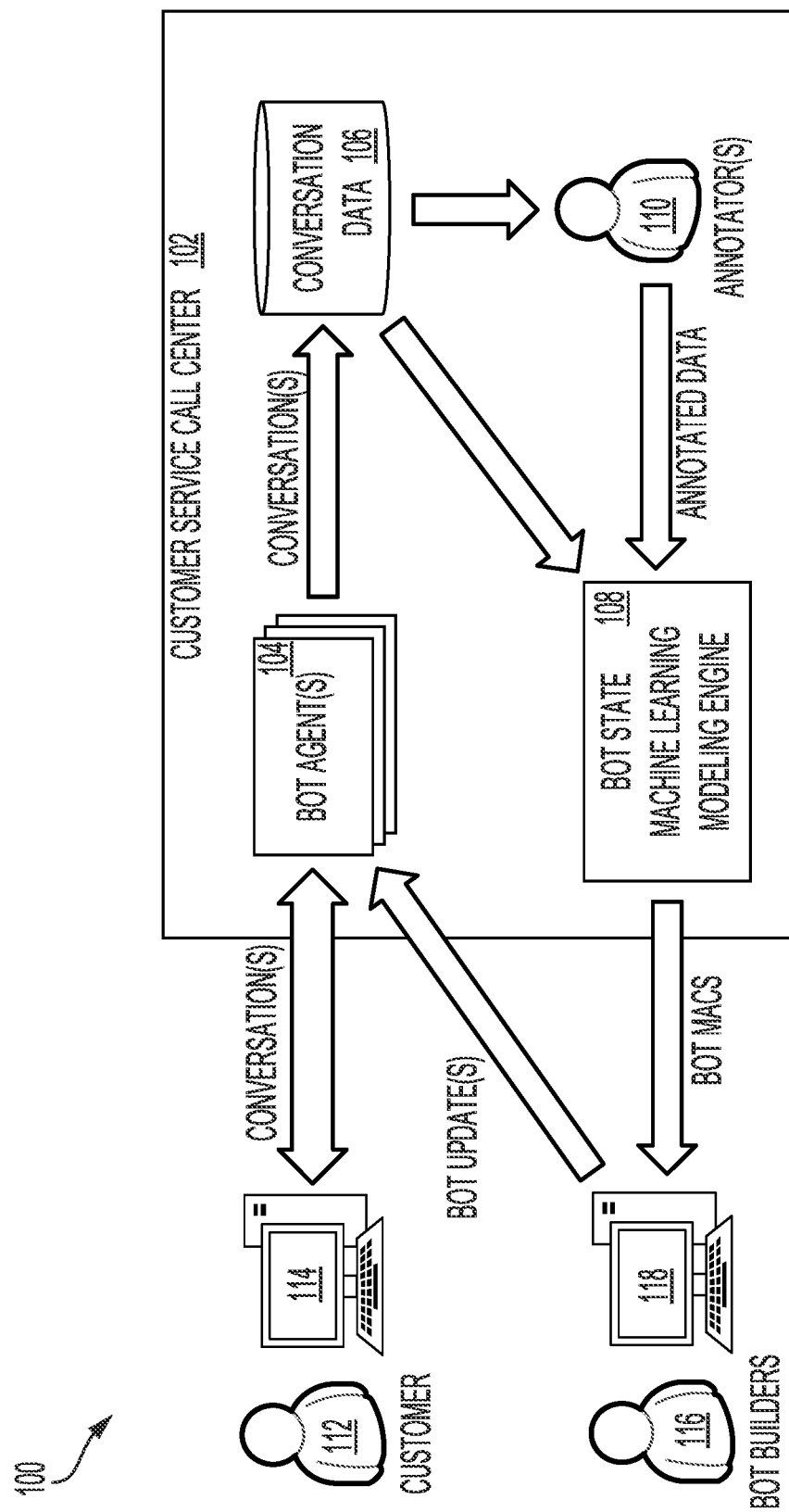
FIG. 1 shows an illustrative example of an environment in which MACS for conversational bot agents are determined and provided to bot builders to allow for generation of bot updates to improve the performance of the conversational bot agents in accordance with various embodiments.

FIG. 1 shows an illustrative example of an environment in which MACS for conversational bot agents 104 are determined and provided to bot builders 116 to allow for generation of bot updates to improve the performance of the conversational bot agents 104 in accordance with various embodiments. In the environment 100, a customer 112, via a computing device 114, may be engaged in a communications session with a conversation bot agent 104 of a customer service call center 102. The conversational bot agents 104 can be configured to autonomously communicate with network devices, such as computing device 114. Further, conversation bot agents 104 can be configured for a specific capability. Examples of capabilities can include updating database records, providing updates to customers, providing additional data about the customer 112 to human agents or other conversation bot agents, determining a customer's intent and routing the customer 112 to a destination system based on the intent, predicting or suggesting responses to human agents communicating with customers, escalating communications sessions to include one or more additional bots or human agents, and other suitable capabilities. In some implementations, while a conversation bot agent 104 is communicating with a customer 112 during a communications session (e.g., using a chat-enabled interface), a communication server (not shown) can automatically and dynamically determine to switch the conversation bot agent 104 with a terminal device utilized by a human agent. For example, conversation bot agents 104 can communicate with customers about certain tasks (e.g., updating a database record associated with a customer 112), whereas, human agents can communicate with customers about more difficult tasks (e.g., communicating using a communications channel to solve a technical issue).

A conversation bot agent 104 can be code that, when executed, is configured to autonomously communicate with customers, such as customer 112, via a computing device 114. For example, a conversation bot agent 104 can be a bot that automatically generates messages to initiate conversations with the customer 112 associated with computing device 114 and/or to automatically respond to messages from computing device 114. In an embodiment, the customer service call center 102 can allow clients (e.g., an external system to the platform of the customer service call center 102) to deploy conversation bot agents 104 in their internal communication systems via the customer service call center 102. In some examples, clients can use their own bots in the platform of the customer service call center, which enables clients to implement the methods and techniques described herein into their internal communications systems.

In some implementations, conversation bot agents 104 can be defined by one or more sources. For example, a data store of the customer service call center 102 can store code representing conversation bot agents 104 that are defined (e.g., created or coded) by clients of the customer service call center 102. For example, a client that has defined its own conversation bot agents 104 can load the conversation bot agents 104 to the customer service call center 102. The conversation bot agents 104 defined by clients can be stored in a client bots data store. In some instances, the customer service call center 102 can include a data store that can be used to store code representing conversation bot agents 104 that are defined by third-party systems. For example, a third-party system can include an independent software vendor. Another data store can store code representing conversation bot agents 104 that are defined by an entity associated with the customer service call center 102. For example, conversation bot agents 104 that are coded by the entity can be loaded to or accessible by customer service call center 102, so that the conversation bot agents 104 can be executed and autonomously communicate with customers. In some implementations, customer service call center 102 can access bots stored in these data stores using a cloud network. The cloud network may be any network, and can include an open network, such as the Internet, personal area network, local area network (LAN), campus area network (CAN), metropolitan area network (MAN), wide area network (WAN), wireless local area network (WLAN), a private network, such as an intranet, extranet, or other backbone.

In some embodiments, the customer service call center 102 can recommend automations to cause a conversation to dynamically switch between a conversation bot agent 104 and a customer 112 during a particular communications session between the conversation bot agent 104 and the computing device 114. For example, the customer service call center 102 can facilitate a communications session between the computing device 114 and a conversation bot agent 104. The conversation bot agent 104 can be configured to autonomously communicate with the computing device 114 by exchanging one or more messages with the computing device 114 during the communications session. The customer service call center 102 can dynamically determine whether to switch a conversation bot agent 104 with a human agent (or in some cases, vice versa) so that a live human agent can communicate with the computing device 114, instead of the conversation bot agent 104. In some implementations, the switching can be performed without a prompt from the customer 112 or a human agent. For example, the switching can be based on message parameters (e.g., scores representing sentiment of a message or series of messages) of the messages exchanged between the computing device 114 and the conversation bot agent 104, without prompting the computing device to request a transfer to a human agent.

In an embodiment, the customer service call center 102 records conversations between customers and the conversation bot agents 104 for evaluation in order to identify any bot states encountered during these conversations. These bot states may include any failure states (e.g., asking for old information, any misunderstandings, inability to assist a customer, inability to transfer the customer to a live agent, certain reprompts, etc.), information gathering states (e.g., customer identification, prompts for new information, requests for confirmation, etc.), transfer states (e.g., offers to transfer to a live agent, prompts to a customer to transfer to a live agent, successful transfers, etc.), assistance states (e.g., provides useful information to a customer, addresses a customer issue, provides accurate responses to queries, etc.), and the like. For instance, when a customer 112 engages in a conversation with a conversation bot agent 104, the customer service call center 102 may record each message, along with any associated bot metadata, in a conversation data store 106. Within the conversation data store 106, the customer service call center 102 may associate each message with a unique identifier corresponding to the particular conversation between a customer 112 and a conversation bot agent 104. The customer service call center 102 may monitor this conversation to determine whether the conversation between a customer 112 and a conversation bot agent 104 has concluded. For instance, the customer service call center 102 may determine that a particular conversation has concluded as a result of the conversation being transferred from a conversation bot agent 104 to a human agent. Alternatively, the customer service call center 102 may determine that a conversation has concluded as a result of the customer 112 having submitted a message indicating that a particular issue has been resolved or other acknowledgment of the conclusion of the conversation. In some instances, the customer service call center 102 may determine that a conversation has concluded when the communications session between a conversation bot agent 104 and a computing device 114 utilized by a customer 112 is terminated.

In an embodiment, a sample set of conversations stored in the conversation data store 106 are provided to a set of annotators 110 for manual evaluation. For example, in some instances, a particular conversation may be provided to a set of annotators 110 to identify any bot states occurring during the particular conversation. These bot states may include a failure of the bot to understand a customer's message (e.g., intent, issue, etc.), a bot ignoring the customer, a bot being stuck in a message loop, detection of customer frustration with the bot, an erroneous transfer by the bot to a human agent, and the like. Additionally, these bot states may include any operation performed by the bot that results in successful transfer of a conversation to a live agent, that results in successful resolution of the issue expressed by a customer during the conversation, and the like. The bot states may further include any information gathering activities, such as prompting the customer to provide identification information, any prompts for new information that may be used to address an issue, any requests for confirmation with regard to operations that are to be performed by the bot, and the like. In an embodiment, each annotator 110 may evaluate each message of a particular conversation and denote any particular state detected corresponding to the message. For example, an annotator 110 may annotate each message of a particular conversation to indicate whether the message is indicative of a particular failure state, is indicative of a particular transfer state, is indicative of a particular information gathering state, and the like.

In an embodiment, annotated data, as well as the original conversation data corresponding to conversations between customers and conversation bot agents 104, are provided to a bot state machine learning modeling engine 108 to generate and train a bot state prediction model that can be used to dynamically and in real-time evaluate messages between customers and conversation bot agents 104 to predict bot states at the conversation level. The bot state machine learning modeling engine 108 may be implemented on a computer system or other system (e.g., server, virtual machine instance, etc.) of the customer service call center 102. Alternatively, the bot state machine learning modeling engine 108 may be implemented as an application or other process executed on a computing system of the customer service call center 102.

In an embodiment, the bot state machine learning modeling engine 108 implements an aggregation strategy to determine the probability that some message within a conversation has a particular state. For instance, the bot state machine learning modeling engine 108 may compute the probability that a particular state is present for each message within a conversation. As an illustrative example, if a particular message has been evaluated by three annotators 110 and one of these annotators 110 has determined that a particular state is present for the particular message, the bot state machine learning modeling engine 108 may determine that the probability of the particular state being present in the message is the number of annotations indicating the particular state divided by the total number of annotations or, in this case, ⅓. The bot state machine learning modeling engine 108 may subtract this probability from one to obtain a probability that the particular message of the conversion does not include this particular state. The bot state machine learning modeling engine 108 may multiply the probabilities obtained for each message in the particular conversation to obtain the probability of the particular state being absent from the particular conversation. The bot state machine learning modeling engine 108 may subtract this probability from one to obtain the probability that the particular state exists within the particular conversation.

The resulting probability of the presence of a particular state within a conversation is monotone decreasing, whereby the presence of more messages may not decrease the probability that a particular state is present. For instance, if all annotators 110 agree that a particular state is present within a particular message, then the probability that the particular state exists within the particular conversation is one regardless of the number of messages within the particular conversation. The resulting annotated conversations and corresponding state probabilities may be used as a "ground truth" or sample data set for training of a classification model usable to dynamically detect states from conversations in real-time. Thus, each message within the sample data set may be known to correspond to a particular classification (e.g., customer frustration, bot has ignored the customer, bot is stuck in a message loop, bot has prompted the customer for new information to resolve an issue, bot has successfully transferred the conversation to a live agent, bot successfully addresses the issue, etc.) subject to the previously computed probabilities corresponding to the presence of each classification. Classification models that may be used to classify messages from a particular conversation for a particular failure state may include a logistic regression algorithm, random forest models, Naïve Bayes models, linear regression models, decision tree models, K-Means clustering models, k-Nearest Neighbors (kNN) models, support-vector machine (SVM) models, gradient boosting machine models, and the like.

In an embodiment, the bot state prediction model provides, as output and for each conversation processed by the bot state prediction model, a confidence score for each possible bot state. The confidence score may correspond to a probability that a particular bot state is present within a conversation. In some instances, the confidence score may be compared to the aforementioned probability of the corresponding state being present in the particular conversation to determine whether the classification model is producing accurate results. For instance, the classification model used to calculate the confidence score for each possible state for a particular conversation may be evaluated to determine, based on the bot state probabilities corresponding to annotator evaluation of the particular conversation, whether the classification model is correctly identifying any bot states that may be present in the particular conversation. Based on this evaluation, the classification model may be modified to increase the likelihood of the classification model generating the desired results.

In an embodiment, the bot state machine learning modeling engine 108 can convert the confidence score generated by the bot state prediction model (e.g., classification model) to a MACS for the particular conversation. For example, the bot state machine learning modeling engine 108 may use the confidence score for each bot state obtained using the bot state prediction model for a particular conversation as input to a MACS prediction model to obtain the MACS for the particular conversation. Alternatively, the bot state machine learning modeling engine 108 may determine whether the confidence score for each bot state satisfies a threshold. If a confidence score for a particular bot state is above the threshold, the bot state machine learning modeling engine 108 may determine that the corresponding bot state is present within the conversation. The presence of bot states within a conversation, subject to a threshold, may be used as input to the MACS prediction model to calculate a MACS for the conversation.

The MACS prediction model may be trained through different techniques. In an embodiment, the MACS prediction model can be trained in parallel to the bot state prediction model by using bot state and MACS annotations generated by the annotators 110 for one or more sample conversations as input to generate a MACS for each of the one or more sample conversations. The resulting MACS may be evaluated to determine, based on the bot state probabilities corresponding to annotator evaluation of the particular conversation and the MACS annotation for the conversation, whether the MACS prediction model is correctly calculating the MACS for the particular conversation. Based on this evaluation, the MACS prediction model may be modified to increase the likelihood of the MACS prediction model generating the desired results.

In an embodiment, the MACS prediction model can be trained using bot states and MACS annotations generated by the annotators 110 for one or more sample conversations and a set of features of the one or more sample conversations. For instance, the bot state machine learning modeling engine 108 may utilize a feature extractor to extract the conversation length of a particular conversation and determine a binary feature indicating if the conversation length is at either extreme in conversation length (e.g., short vs. long). The binary feature corresponding to the conversation length may increase the correlation between the MACS score determined by the annotators 110 based on manual evaluation of the conversation and that predicted by the MACS prediction model. Thus, this binary feature may be used to further improve the training of the MACS prediction model.

In some embodiments, the MACS prediction model can be trained using the predicted bot state confidence scores generated by the bot state prediction model described above. For instance, the bot state machine learning modeling engine 108 may use the confidence scores generated by the bot state prediction model, as well as the annotated MACS determined by the annotators 110 for the sample conversation, as input the MACS prediction model to generate a predicted MACS for the sample conversation. This predicted MACS may be compared to the annotated MACS determined by the annotators 110 to determine whether the MACS prediction model is generating accurate results. Based on this evaluation, the MACS prediction model may be modified to increase the likelihood of the MACS prediction model generating the desired MACS for the sample conversation. In some instances, the MACS prediction model may be trained using a combination of the predicted bot state confidence scores and a set of features of the one or more sample conversations. The set of features may be similar to those described above, including a binary feature indicating if the conversation length is at either extreme in conversation length.

In an embodiment, the evaluation of the MACS prediction model based on the predicted MACS for different sample conversations and the annotated MACS for these different sample conversations as determined by the annotators 110 can be used to further determine the impact of each bot state on the MACS for the different sample conversations. For instance, based on the difference between the predicted MACS and the annotated MACS determined by the annotators 110, the relative impact of a bot state to the MACS can be determined. This determined impact may be used to train the MACS prediction model to better predict the MACS for a given conversation based on the presence (or absence) of different bot states, as determined based on the bot state confidence scores or other indicator of the presence of particular bot states as determined by the bot state prediction model or by the annotators 110.

The resulting MACS may correspond to a quality of the conversation and performance of a conversation bot agent 104 with regard to a particular conversation. For instance, a MACS of "1" may correspond to a bad conversation where the conversation bot agent 104 was not helpful in addressing a customer's particular issue. Alternatively, a MACS of "5" may indicate that the conversation bot agent 104 was helpful (e.g., provides relevant action or information that pertains to a customer's intent) and the conversation was uneventful, resulting in a positive customer experience. It should be noted that the range of possible MACS values may be determined by the customer service call center 102 to denote possible performance metrics for a conversation bot agent 104 with regard to a particular conversation with a customer. Thus, other MACS ranges may be used in addition to, or as an alternative to, the aforementioned "1-5" range.

In an embodiment, once the bot state prediction model and the MACS prediction model have been trained to process new conversations between conversation bot agents 104 and customers, the customer service call center 102 can implement these prediction models to detect bot states within an active conversation and calculate the MACS for the conversation in real-time. For instance, as a customer 112 engages in a conversation with a conversation bot agent 104 via a communications session between the conversation bot agent 104 and the computing device 114, the bot state machine learning modeling engine 108 may process messages between the customer 112 and the conversation bot agent 104 to detect any bot states for the conversation bot agent 104 and, based on these bot states, determine a MACS for the conversation. As more bot states are detected, the bot state machine modeling engine 108 (via the MACS prediction model) may continue to decrement the MACS for the conversation to represent a worsening performance of the conversation bot agent 104. If the conversation with the conversation bot agent 104 is terminated (e.g., the conversation is transferred to a human agent, the customer 112 has disconnected from the communications session, etc.), the bot state machine learning modeling engine 108 may calculate a final MACS for the conversation based on the bot states (if any) detected by the bot state prediction model.

In an embodiment, the bot state machine learning modeling engine 108 provides the MACS for each conversation to bot builders 116 to allow these bot builders 116 to update the conversation bot agents 104. The MACS for a conversation can be provided via an interface or portal provided by the customer service call center 102 and accessible via a computing device 118 utilized by a bot builder 116. In some instances, the bot state machine learning modeling engine 108 can provide, in addition to MACS for conversations in which conversation bot agents 104 configured by a bot builder 116, the bot states detected and other insights that may be useful to the bot builder 116 for updating the conversation bot agents 104. For instance, if the MACS for a particular class of conversation bot agents 104 is consistently below a threshold (e.g., the conversation bot agents 104 are performing poorly) as a result of a particular set of less favorable bot states being encountered, a bot builder 116 may generate updates to the conversation bot agents 104 to reduce the likelihood of these less favorable bot states occurring and to improve the MACS for these conversation bot agents 104.

As noted above, the bot state machine learning modeling engine 108 can detect bot states and calculate the MACS for a particular conversation or for each message in the particular conversation in real-time. In an embodiment, the particular conversation can be monitored by a live agent (e.g., human), whereby the live agent may be supplied with the real-time MACS for the conversation and information regarding any detected bot states. If the MACS for the conversation falls below a threshold, or certain bot states are detected (e.g., particular failure states, etc.), the live agent may transfer the conversation from the conversation bot agent 104 to the live agent. This transfer, in some instances, may serve as a failure state and may be used to calculate the final MACS for the conversation. The final MACS for the conversation can be provided to bot builders 116 as described above.

Figure 2:
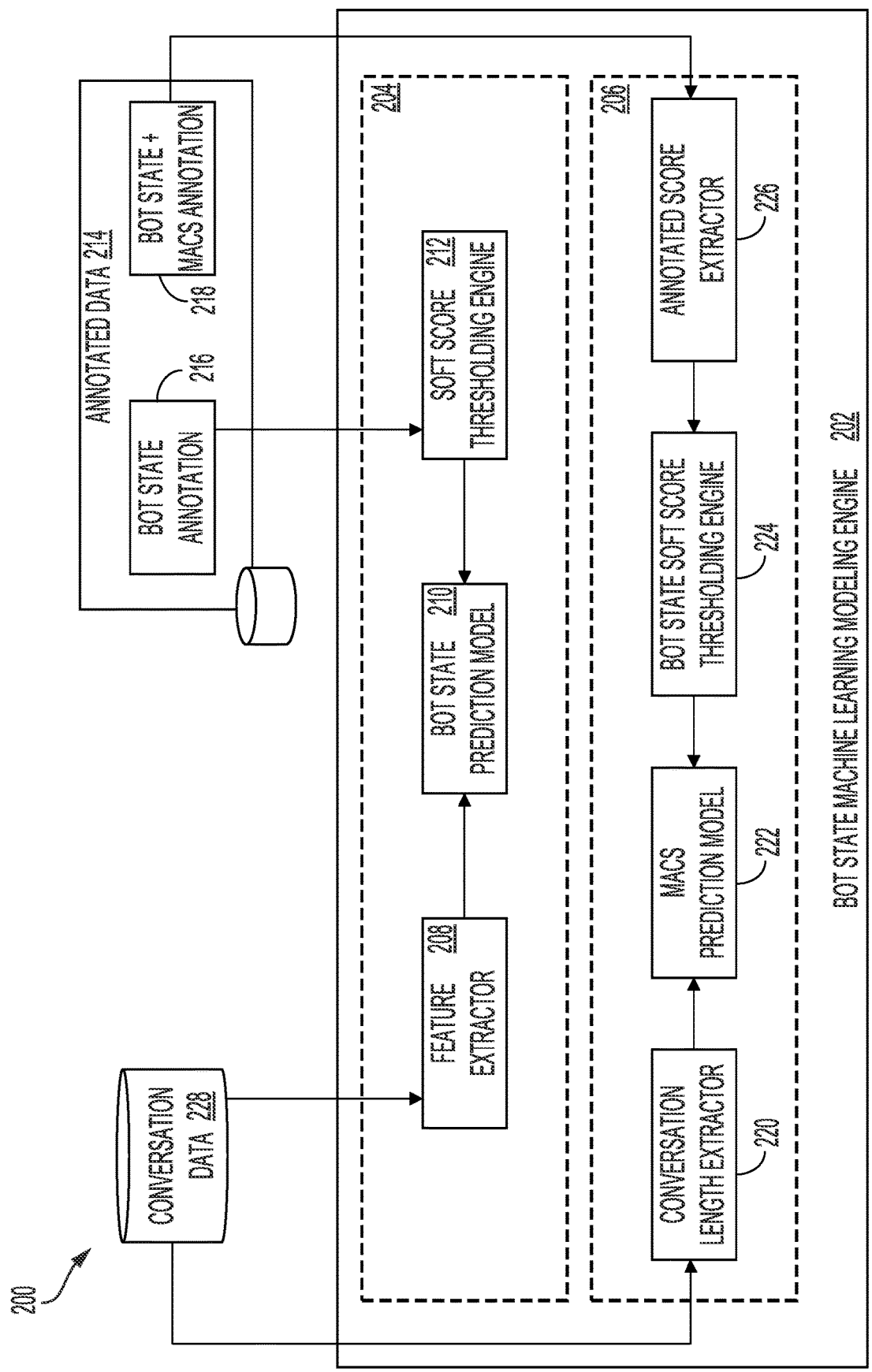
FIG. 2 shows an illustrative example of an environment in which a bot state machine learning modeling engine performs parallel training of a bot state prediction model and of a MACS prediction model using bot state and MACS annotations in accordance with at least one embodiment.

FIG. 2 shows an illustrative example of an environment 200 in which a bot state machine learning modeling engine 202 performs parallel training of a bot state prediction model 210 and of a MACS prediction model 222 using bot state and MACS annotations in accordance with at least one embodiment. In the environment 200, the bot state machine learning modeling engine 202 performs training 204 of a bot state prediction model 210 using annotated data 214 generated by annotators based on sample conversations between conversation bot agents and customers or other entities, as well as conversation data corresponding to the sample conversations evaluated by the annotators to generate the annotated data 214. For instance, annotators may evaluate sample conversations to identify different bot states of the conversation bot agents engaged in these sample conversations. Further, based on these bot states, the annotators may calculate a MACS for each sample conversation. The different bot states and corresponding MACS for a sample conversation may be stored as annotated data 214. The annotated data 214 may include bot state annotation data 216 (e.g., data generated by each annotator denoting the bot states detected within a sample conversation) and bot state and MACS annotation data 218 (e.g., data generated by each annotator denoting the bot states detected within a sample conversation and the corresponding MACS for the sample conversation).

In an embodiment, to perform training 204 of the bot state prediction model 210, the bot state machine learning modeling engine 202 uses a soft score thresholding engine 212 to process bot state annotation data 216 and determine probabilities corresponding to the likelihood of bot states being present within a sample conversation. As noted above, the bot state machine learning modeling engine 202 may implement an aggregation strategy to determine the probability that some message within a conversation has a particular state. For instance, the bot state machine learning modeling engine 202, via the soft score thresholding engine 212, may compute the probability that a particular state is present for each message within a conversation. The soft score thresholding engine 212 may multiply the probabilities obtained for each message in the particular conversation to obtain the probability of the particular state being absent from the particular conversation. The soft score thresholding engine 212 may subtract this probability from one to obtain the probability that the state exists within the particular conversation. These probabilities may be used as input to the bot state prediction model 210 to train the bot state prediction model 210.

In an embodiment, the training 204 of the bot state prediction model 210 may further include calculating features of the sample conversations using a feature extractor 208. As noted above, the bot state machine learning modeling engine 202 may utilize a feature extractor 208 to extract the conversation length of a particular conversation from the conversation data store 228 and determine a binary feature indicating if the conversation length is at either extreme in conversation length (e.g., short vs. long). The binary feature corresponding to the conversation length may provide correlations between probabilities of bot states being detected in a sample conversation and the length of the conversation. Thus, this binary feature may be used to further train the bot state prediction model 210 to detect bot states and more accurately calculate the confidence score corresponding to the likelihood of a particular state being present in a given conversation.

Various features may be extracted using the feature extractor 208. For instance, the feature extractor 208 may calculate a reprompt feature, which may be calculated when a conversation bot agent has repeated a previous message as a result of a failure of the conversation bot agent to understand a customer's intent. Another feature that may be extracted by the feature extractor 208 may include an escalation count feature, which may correspond to the number of times a customer issue has been escalated during a conversation between the customer and a conversation bot agent. These escalations may serve as a signal that there has been improper routing by the conversation bot agent. As another example, the feature extractor 208 may calculate an unplanned escalation feature, which may correspond to any customer requests during a conversation with a conversation bot agent to be transferred to a human agent. This may serve as an indication that the conversation bot agent is failing to address the customer's issues, resulting in a frustrating customer experience. The feature extractor 208 may further calculate a number of fallbacks feature, which may correspond to the number of times the conversation bot agent has asked the customer to rephrase a message. This may serve as an indication that the conversation bot agent is experiencing difficulty in understanding customer messages, resulting in a negative customer experience. Other features that may be calculated by the feature extractor 208 may include a unique intents detected feature (e.g., the number of intents in a conversation, which may correlate to the probability of the conversation bot agent misunderstanding one of the intents), a repeated intents feature (e.g., if intents are being repeated, it can serve as an indication that the customer is stuck in a loop with the conversation bot agent or the conversation bot agent has failed to understand the intent or provide an adequate response), and the like.

Other features that are not indicative of a bot failure may also be extracted using the feature extractor 208. For example, a consumer identification feature may be calculated that corresponds to the prompts provided by the bot to the customer for information that may be used to identify the customer. As another illustrative example, an information gathering feature may be calculated based on prompts provided by the bot to the customer for any new information that may be used to resolve a particular issue or intent. The feature extractor 208 may further calculate a check understanding feature, which may correspond to prompts provided by the bot to confirm information that the bot has access to as related to the customer and/or the issue that is to be addressed, as well as any responses provided by the customer. For example, if the bot prompts the customer to indicate whether the information provided is correct, the customer may provide a response such as "yes," "no, actually," and the like. This pairing of bot prompts and customer responses may be used by the feature extractor 208 to calculate the check understanding feature. Another example of a feature that may be calculated by the feature extractor 208 may include a provides assistance feature. The provides assistance feature may be calculated based on the bot providing useful information to the customer or otherwise addressing or answering a customer's issue, intent, or other queries. The information provided by the bot may be evaluated to determine whether the information is relevant and/or actionable to the customer.

In some instances, certain features may be applicable once a conversation between a customer and a conversation bot agent has been closed (e.g., calculations performed not in real-time). For instance, the feature extractor 208 may calculate a repeat contact feature, which corresponds to the number of times a customer has re-engaged with a particular brand associated with the customer service call center after the conversation with a conversation bot agent has closed within a predetermined period of time. This feature may serve as an indication of different failure modes being present within the conversation. As another example, the feature extractor 208 may calculate the aforementioned binary feature indicating if the conversation length is at either extreme in conversation length (e.g., short vs. long).

The output generated by the bot state prediction model 210 (e.g., confidence scores) may be evaluated by annotators or other entities associated with the customer service call center to determine whether the bot state prediction model 210 is generating accurate or correct results. In some instances, the confidence scores generated by the bot state prediction model 210 may be compared to the probabilities of the corresponding bot states being present in the particular conversation to determine whether the bot state prediction model 210 is producing accurate results. For instance, the bot state prediction model 210 used to calculate the confidence score for each possible bot state for a particular conversation may be evaluated to determine, based on the bot state probabilities corresponding to annotator evaluation of the particular conversation from the bot state annotation data 216, whether the bot state prediction model 210 is correctly identifying any bot states that may be present in the particular conversation. Based on this evaluation, the bot state prediction model 210 may be modified to increase the likelihood of the bot state prediction model 210 generating the desired results.

In parallel to the training 204 of the bot state prediction model 210, the bot state machine learning model engine 202 may perform training 206 of a MACS prediction model 222 for the calculation of a MACS for each sample conversation. For instance, as illustrated in FIG. 2, the bot state machine learning modeling engine 202 may use an annotated score extractor 226 to obtain the MACS for each sample conversation from the bot state and MACS annotation data 218 generated by the annotators. The MACS for each sample conversation, along with the bot states detected by the annotators, may be provided to a bot state soft score thresholding engine 224, which may process the MACS for each sample conversation and the corresponding bot states detected in the sample conversation to identify any correlations between bot states and MACS. These correlations, as well as the annotated MACS and detected bot states provided by annotators, may be used as input to the MACS prediction model 222 for training of the MACS prediction model 222.

In an embodiment, the training 206 of the MACS prediction model 222 may further include using the length of each sample conversation to identify any correlations between conversation length and MACS for a particular sample conversation. For instance, the MACS prediction model 222 may be trained to use conversation length for a particular conversation as input to determine the impact of different bot states to the MACS for the conversation subject to the conversation length of the conversation. For example, the impact of a bot state may change as the length of a conversation increases. Thus, the bot state machine learning modeling engine 202 may utilize the conversation length extractor 220 to obtain the conversation length for each sample conversation from the conversation data store 228 and utilize this conversation length as input to the MACS prediction model 222, in addition to the annotated MACS and detected bot states for the sample conversation, to train the MACS prediction model 222.

The output of the MACS prediction model 222 may include a MACS for each sample conversation. The resulting MACS may be evaluated to determine, based on the bot state probabilities corresponding to annotator evaluation of the sample conversations and the MACS annotation for the sample conversations, as obtained from the annotated data 214, whether the MACS prediction model 222 is correctly calculating the MACS for the particular conversation. Based on this evaluation, the MACS prediction model 222 may be modified to increase the likelihood of the MACS prediction model 222 generating the desired results.

Figure 3:
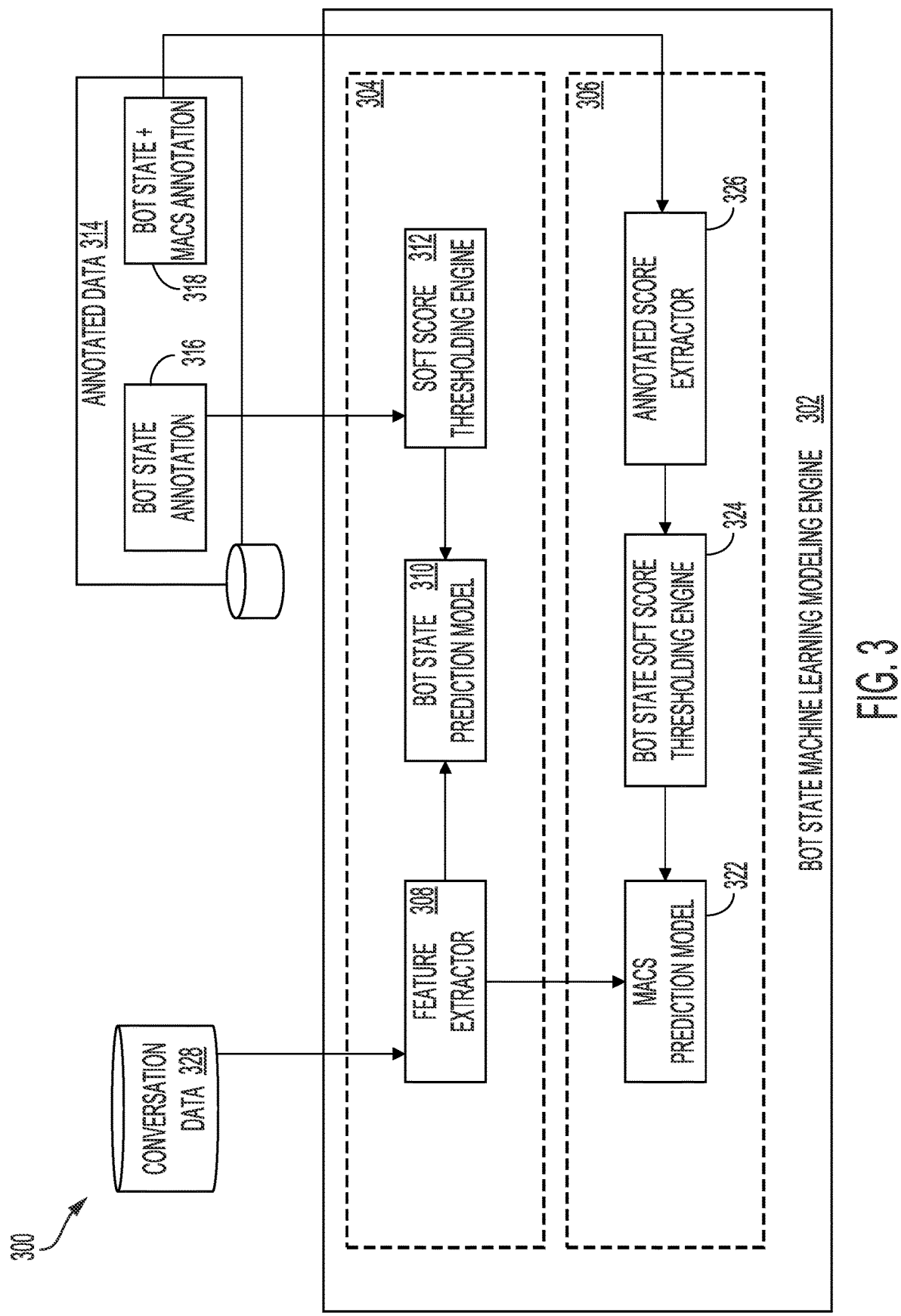
FIG. 3 shows an illustrative example of an environment in which a bot state machine learning modeling engine performs parallel training of a bot state prediction model and of a MACS prediction model using bot state and MACS annotations and features in accordance with at least one embodiment.

FIG. 3 shows an illustrative example of an environment 300 in which a bot state machine learning modeling engine 302 performs parallel training of a bot state prediction model 310 and of a MACS prediction model 322 using bot state and MACS annotations and features in accordance with at least one embodiment. The environment 300 may be similar to that of the environment 200 illustrated in FIG. 2 and described above. For instance, training 304 of the bot state prediction model 310 may be performed using annotated data 314 generated by annotators based on sample conversations between conversation bot agents and customers or other entities, as well as conversation data corresponding to the sample conversations evaluated by the annotators to generate the annotated data 314. The annotated data 214 may include bot state annotation data 316 (e.g., data generated by each annotator denoting the bot states detected within a sample conversation) and bot state and MACS annotation data 318 (e.g., data generated by each annotator denoting the bot states detected within a sample conversation and the corresponding MACS for the sample conversation), as described above.

As noted above, the training 304 of the bot state prediction model 310 may further include calculating features of the sample conversations using a feature extractor 308. The feature extractor 308 may determine a binary feature indicating if the conversation length is at either extreme in conversation length (e.g., short vs. long). The binary feature corresponding to the conversation length may be used to identify correlations between probabilities of bot states being detected in a sample conversation and the length of the conversation. The output generated by the bot state prediction model 310 (e.g., confidence scores) may be evaluated by annotators or other entities associated with the customer service call center to determine whether the bot state prediction model 310 is generating accurate or correct results. For instance, the bot state prediction model 310 used to calculate the confidence score for each possible bot state for a particular conversation may be evaluated to determine, based on the bot state probabilities corresponding to annotator evaluation of the particular conversation from the bot state annotation data 316, whether the bot state prediction model 310 is correctly identifying any bot states that may be present in the particular conversation. Based on this evaluation, the bot state prediction model 310 may be modified.

In an embodiment, rather than relying on a conversation length extractor to determine the length of each sample conversation from the conversation data store 328, as described above in connection with FIG. 2, training 306 of the MACS prediction model 322 may be performed using the features extracted by the feature extractor 308 from the sample conversations stored in the conversation data store 328. For instance, the bot state machine learning modeling engine 302 may utilize the feature extractor 308 to extract the conversation length of a particular conversation and determine a binary feature indicating if the conversation length is at either extreme in conversation length (e.g., short vs. long). The binary feature corresponding to the conversation length may increase the correlation between the MACS score determined by the annotators (as provided in the bot state and MACS annotation data 318) based on manual evaluation of the conversation and that predicted by the MACS prediction model 322. Thus, this binary feature may be used to improve the training of the MACS prediction model 322.

Similar to the training 206 described above in connection with FIG. 2 for the MACS prediction model 222, the training 306 of the MACS prediction model 322 may be performed using an annotated score extractor 326 and a bot state soft score thresholding engine 324. For instance, the bot state machine learning modeling engine 302 may use the annotated score extractor 326 to obtain the MACS for each sample conversation from the bot state and MACS annotation data 318 generated by the annotators. The MACS for each sample conversation, along with the bot states detected by the annotators, may be provided to the bot state soft score thresholding engine 324, which may process the MACS for each sample conversation and the corresponding bot states detected in the sample conversation to identify any correlations between bot states and MACS. These correlations, as well as the annotated MACS and detected bot states provided by annotators, may be used as input to the MACS prediction model 322 for training of the MACS prediction model 322.

Figure 4:
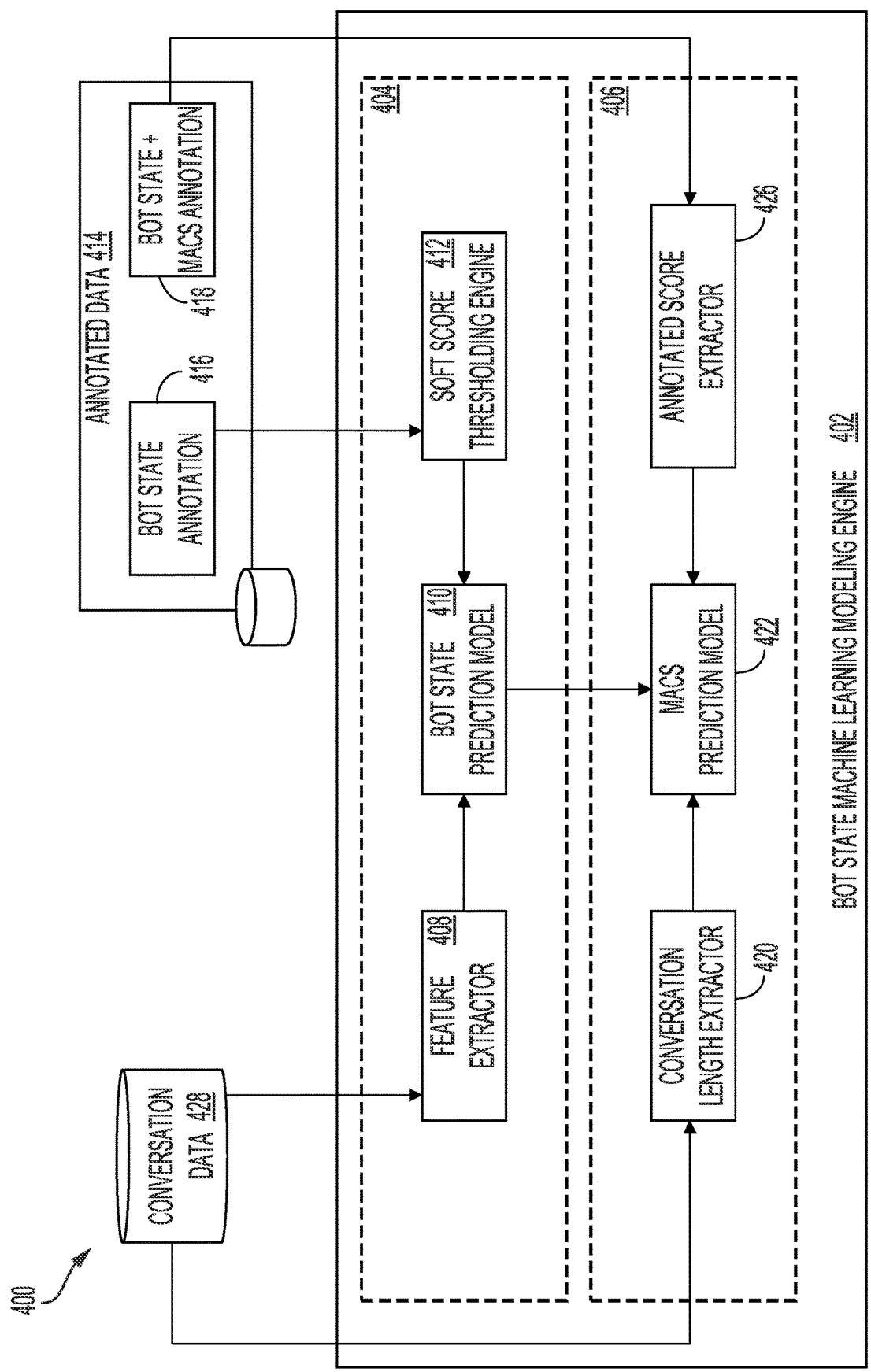
FIG. 4 shows an illustrative example of an environment in which a bot state machine learning modeling engine performs training of a MACS prediction model using predictions generated by a bot state prediction model in accordance with at least one embodiment.

FIG. 4 shows an illustrative example of an environment 400 in which a bot state machine learning modeling engine 402 performs training of a MACS prediction model 422 using predictions generated by a bot state prediction model 410 in accordance with at least one embodiment. In the environment 400, training 404 of the bot state prediction model 410 is performed subject to a similar process to that described above in connection with FIGS. 2 and 3. For instance, the bot state prediction model 410 may be trained using a soft score thresholding engine 412, which may process bot state annotation data 416 from the annotated data 414 to determine probabilities corresponding to the likelihood of bot states being present within a sample conversation. The soft score thresholding engine 412, may compute the probability that a bot state is present for each message within a conversation and the probability that a bot state exists within the particular conversation. These probabilities may be used as input to the bot state prediction model 410 to train the bot state prediction model 410.

The training 404 of the bot state prediction model 410 may further include calculating features of the sample conversations using a feature extractor 408. As noted above, the feature extractor 408 may be used to extract the conversation length of a particular conversation from the conversation data store 428 and determine a binary feature indicating if the conversation length is at either extreme in conversation length (e.g., short vs. long). The binary feature corresponding to the conversation length may provide correlations between probabilities of bot states being detected in a sample conversation and the length of the conversation. Thus, this binary feature may be used to further train the bot state prediction model 410 to detect bot states and more accurately calculate the confidence score corresponding to the likelihood of a bot state being present in a given conversation.

The output of the bot state prediction model 410 may be evaluated to determine whether the bot state prediction model 410 is producing accurate results (e.g., confidence scores for different bot states for a given conversation). Similar to the training 204 and 304 described above, the bot state prediction model 410 used to calculate the confidence score for each possible bot state for a particular conversation may be evaluated to determine, based on the bot state probabilities corresponding to annotator evaluation of the particular conversation from the bot state annotation data 416, whether the bot state prediction model 410 is correctly identifying any bot states that may be present in the particular conversation. Based on this evaluation, the bot state prediction model 410 may be modified to increase the likelihood of the bot state prediction model 410 generating the desired results.

In an embodiment, the output of the bot state prediction model 410 is further used to perform training 406 of the MACS prediction model 422. For instance, the resulting confidence scores generated by the bot state prediction model 410 may be used as input to the MACS prediction model 422 to produce a MACS for each sample conversation. This may obviate the need to utilize a bot state soft score thresholding engine as described above in connection with FIGS. 2 and 3 to calculate confidence scores in parallel to the training 404 of the bot state prediction model 410. Thus, rather than having the output of the annotated score extractor 426 being used by a bot state soft score thresholding engine to generate the confidence scores, the output of the annotated score extractor 426 may be provided directly to the MACS prediction model 422 for training of the MACS prediction model 422.

As noted above, the bot state machine learning modeling engine 402 may use the annotated score extractor 426 to obtain the MACS for each sample conversation from the bot state and MACS annotation data 418 generated by the annotators. The MACS for each sample conversation, along with the bot states detected by the annotators, may be provided to the MACS prediction model 422, which may be used to evaluate the performance of the MACS prediction model 422. For instance, the predicted MACS generated by the MACS prediction model 422 may be compared to the annotated MACS determined by the annotators and extracted from the bot state and MACS annotation data 418 to determine whether the MACS prediction model 422 is generating accurate results. Based on this evaluation, the MACS prediction model 422 may be modified to increase the likelihood of the MACS prediction model 422 generating the desired MACS for the sample conversations.

Similar to the training 206 described above in connection with FIG. 2, the training 406 may also rely on a conversation length extractor 420 to obtain the conversation length for each sample conversation for which a MACS is to be determined using the MACS prediction model 422. As noted above, the training 406 of the MACS prediction model 422 may further include using the length of each sample conversation to identify any correlations between conversation length and MACS for a particular sample conversation. For instance, the MACS prediction model 422 may be trained to use conversation length for a particular conversation as input to determine the impact of different bot states to the MACS for the conversation subject to the conversation length of the conversation. Thus, the bot state machine learning modeling engine 402 may utilize the conversation length extractor 420 to obtain the conversation length for each sample conversation from the conversation data store 428 and utilize this conversation length as input to the MACS prediction model 422, in addition to the annotated MACS and bot state confidence scores for the sample conversation, to train the MACS prediction model 422.

Figure 5:
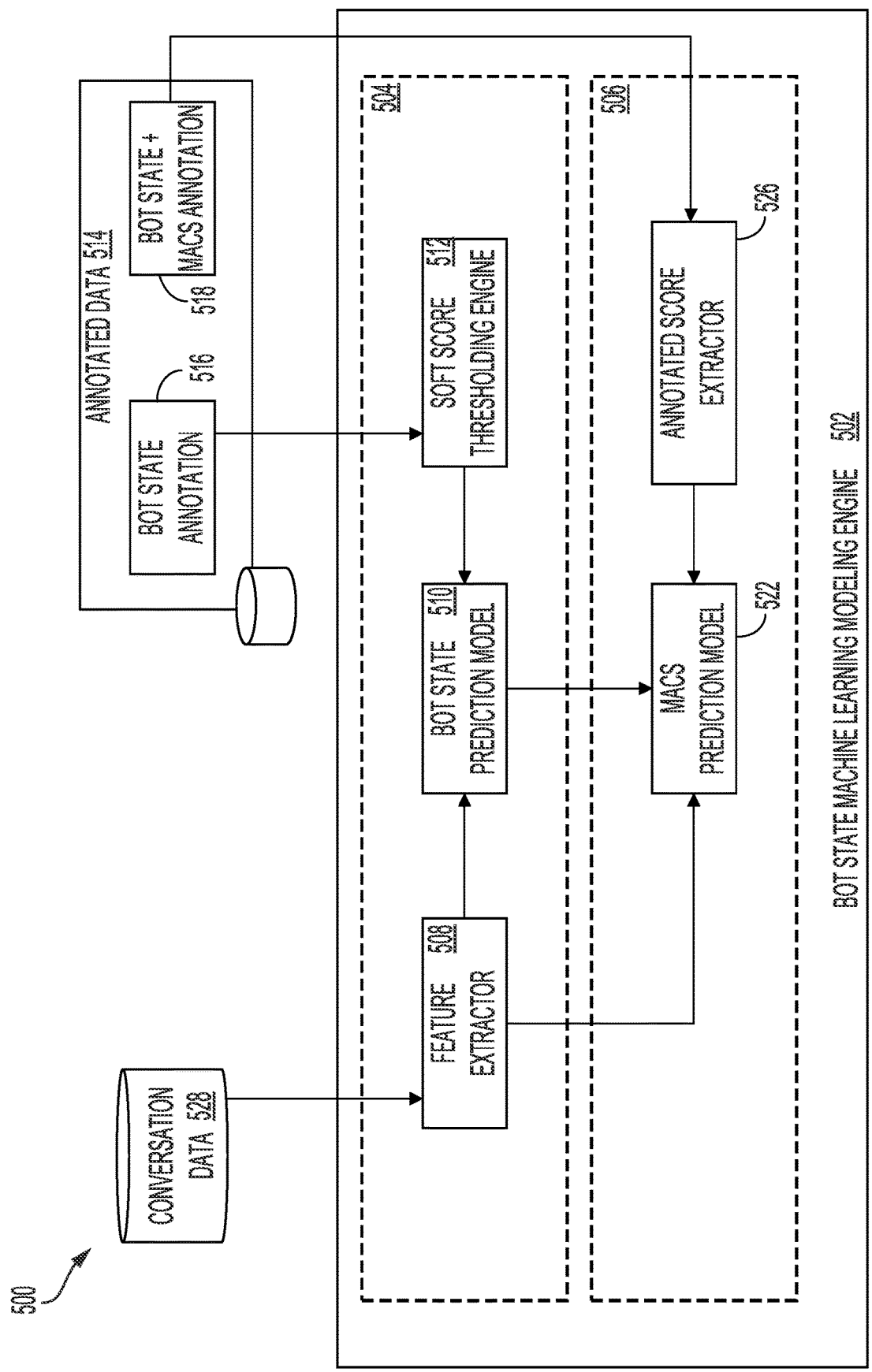
FIG. 5 shows an illustrative example of an environment in which a bot state machine learning modeling engine performs training of a MACS prediction model using predictions generated by a bot state prediction model and features in accordance with at least one embodiment.

FIG. 5 shows an illustrative example of an environment 500 in which a bot state machine learning modeling engine 502 performs training 506 of a MACS prediction model 522 using predictions generated by a bot state prediction model 510 and features in accordance with at least one embodiment. In the environment 500, training 504 of the bot state prediction model 510 is performed subject to a similar process to that described above in connection with FIGS. 2-4. For instance, the bot state prediction model 510 may be trained using a soft score thresholding engine 512, which may process bot state annotation data 516 from the annotated data 514 to determine probabilities corresponding to the likelihood of bot states being present within a sample conversation. The soft score thresholding engine 512, may compute the probability that a bot state is present for each message within a conversation and the probability that a bot state exists within the particular conversation. These probabilities may be used as input to the bot state prediction model 510 to train the bot state prediction model 510.

Similar to the training 306 of the MACS prediction model 322 described above in connection with FIG. 3, the training 506 of the MACS prediction model 522 may be performed using the features extracted by the feature extractor 508 from the sample conversations stored in the conversation data store 528. For instance, the bot state machine learning modeling engine 502 may utilize the feature extractor 508 to extract the conversation length of a particular conversation and determine a binary feature indicating if the conversation length is at either extreme in conversation length (e.g., short vs. long). The binary feature corresponding to the conversation length may increase the correlation between the MACS determined by the annotators (as provided in the bot state and MACS annotation data 518) based on manual evaluation of the conversation and that predicted by the MACS prediction model 522. Thus, this binary feature may be used to improve the training of the MACS prediction model 522.

Further, similar to the training 406 described above in connection with FIG. 4, the output of the bot state prediction model 510 can be used to perform training 506 of the MACS prediction model 522. The resulting confidence scores generated by the bot state prediction model 510 may be used as input to the MACS prediction model 522 to produce a MACS for each sample conversation. Further, the bot state machine learning modeling engine 502 may use the annotated score extractor 526 to obtain the MACS for each sample conversation from the bot state and MACS annotation data 518 and provide these MACS to the MACS prediction model 522. These MACS may be used to evaluate the performance of the MACS prediction model 522 and, based on this evaluation, modify the MACS prediction model 502 to increase the likelihood of the MACS prediction model 522 generating the desired MACS for the sample conversations.

Figure 6:
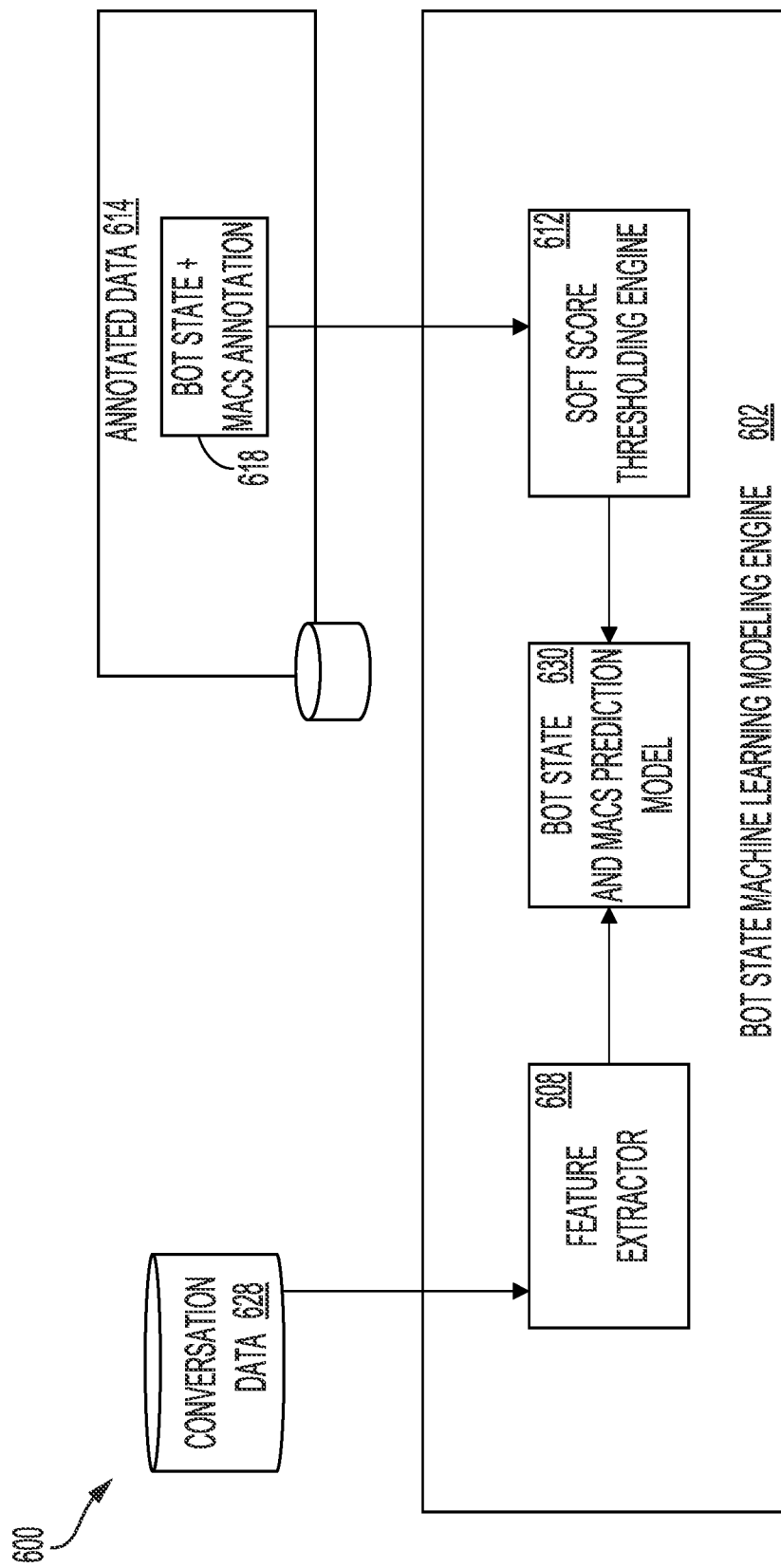
FIG. 6 shows an illustrative example of an environment in which a bot state machine learning modeling engine performs training of a joint bot state and MACS prediction model using bot state and MACS annotations and features in accordance with at least one embodiment.

FIG. 6 shows an illustrative example of an environment 600 in which a bot state machine learning modeling engine 602 performs training of a joint bot state and MACS prediction model 630 using bot state and MACS annotations and features in accordance with at least one embodiment. In the environment 600, the bot state machine learning modeling engine 602 trains a joint bot state and MACS prediction model 630 that can be used to both identify bot states within a conversation and provide a MACS for a conversation bot agent engaged in the conversation with a customer (after a conversation has closed or in real-time). Thus, rather than performing parallel training processes for distinct bot state and MACS prediction models, as illustrated in FIGS. 2-5, the joint bot state and MACS prediction model 630 may be trained through a singular process as described herein.

The training of the bot state and MACS prediction model 630 may incorporate similar features as those described above in connection with FIGS. 2-5. For instance, the bot state and MACS prediction model 630 may be trained using a soft score thresholding engine 612, which may process bot state and MACS annotation data 618 from the annotated data 614 to determine probabilities corresponding to the likelihood of bot states being present within a sample conversation. The soft score thresholding engine 612 may compute the probability that a bot state is present for each message within a conversation and the probability that a bot state exists within the particular conversation. These probabilities may be used as input to the bot state and MACS prediction model 630 to train the bot state and MACS prediction model 630 to predict bot states of a conversation bot agent during a conversation with a customer.

In addition to processing bot state and MACS annotation data 618 from the annotated data 614 to generate inputs for training of the bot state and MACS prediction model 630, the bot state machine learning modeling engine 602 may utilize a feature extractor 608 to calculate a set of features from conversation data stored in the conversation data store 628 that can be used to further train the bot state and MACS prediction model 630. As noted above, the feature extractor 608 may be used to extract the attributes of a particular conversation from the conversation data store 628 and determine features that may provide correlations between probabilities of bot states being detected in a sample conversation and the attributes of the conversation. Thus, these features may be used to further train the bot state and MACS prediction model 630 to detect bot states and more accurately calculate the confidence score corresponding to the likelihood of a bot state being present in a given conversation.

Additionally, the features may be used to train the bot state and MACS prediction model 630 to predict the MACS for a conversation bot agent for a particular conversation. For instance, the bot state and MACS prediction model 630 may utilize the features calculated by the feature extractor 508, as well as the bot state confidence scores generated by the bot state and MACS prediction model 630 to predict a MACS for the conversation. The features may increase the correlation between the MACS determined by the annotators (as provided in the bot state and MACS annotation data 618) based on manual evaluation of the conversation and that predicted by the bot state and MACS prediction model 630. Thus, these features may be used to improve the training of the bot state and MACS prediction model 630.

Figure 7:
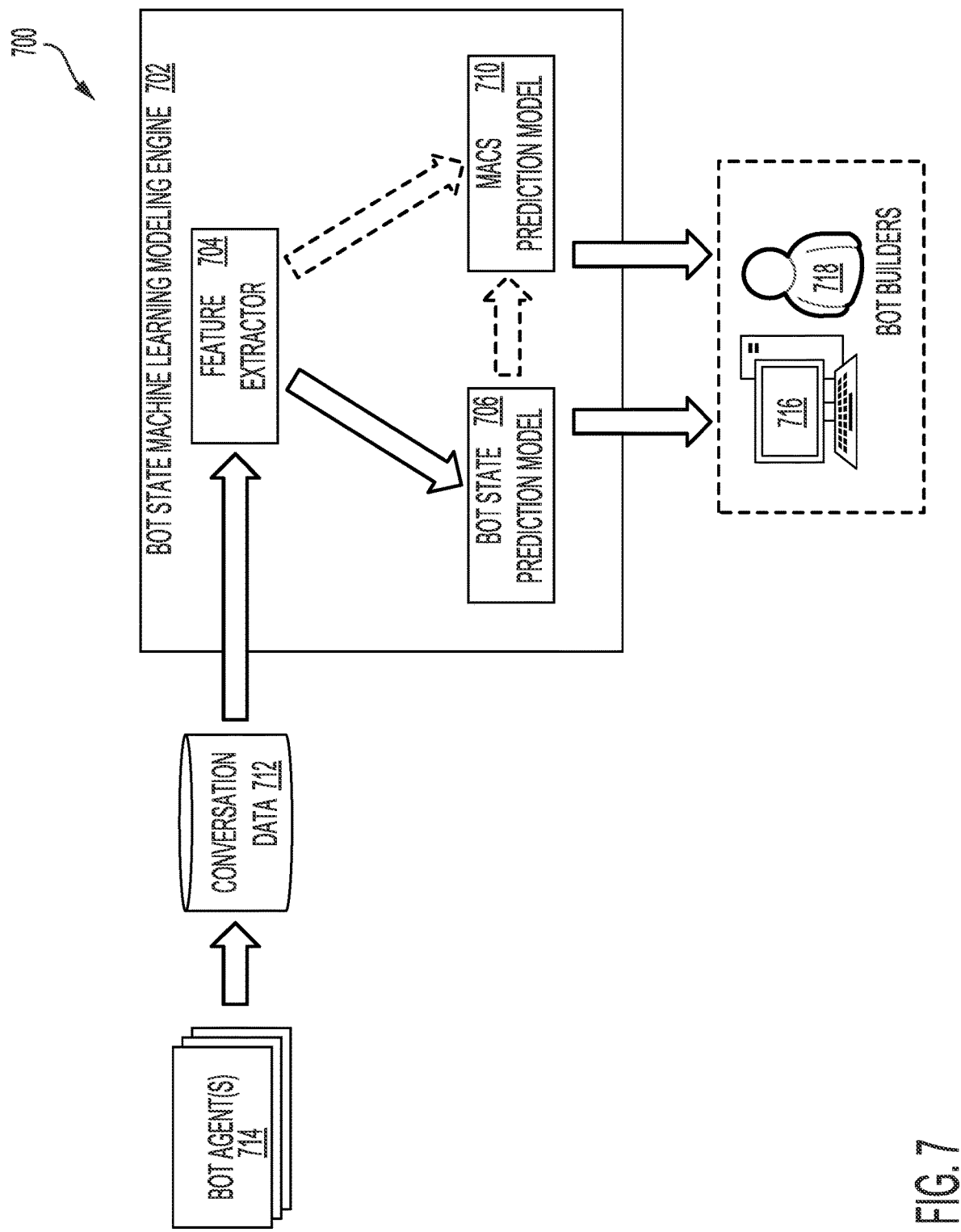
FIG. 7 shows an illustrative example of an environment in which a MACS prediction model provides MACS for one or more bot agents based on conversation data for the one or more bot agents and identified bot states in accordance with at least one embodiment.

FIG. 7 shows an illustrative example of an environment 700 in which a MACS prediction model 710 provides MACS for one or more bot agents 714 based on conversation data for the one or more bot agents 714 and identified bot states in accordance with at least one embodiment. In the environment 700, conversations between conversation bot agents 714 and customers and other users of the customer service call center may be recorded in a conversation data store 712. A conversation stored within the conversation data store 712 may include any messages communicated between a particular conversation bot agent 714 and a customer or other entity over a communications session established between the conversation bot agent 714 and a computing device of the customer or other entity. For instance, a customer or other user may use a computing device to initiate a conversation with a conversation bot agent 714 regarding resolution of an issue. The conversation bot agent 714 may automatically identify the customer or other user's intent, as well as key user information (e.g., order number, account number, etc.) that may be used to address the intent. As noted above, conversation bot agents 714 can be configured to autonomously communicate with customers and other users, as well as for a specific capability.

In an embodiment, conversation data for a particular conversation between a conversation bot agent 714 and a customer or other user over a communications session is used as input to a feature extractor 704 of the bot state machine learning modeling engine 702. For instance, conversation data from the conversation data store 712 may be streamed automatically to the feature extractor 704 to calculate a set of features corresponding to a conversation between a conversation bot agent 714 and a customer or other user. As noted above, the bot state machine learning modeling engine 702 may utilize a feature extractor 704 to calculate the conversation length of a particular conversation and determine a binary feature indicating if the conversation length is at either extreme in conversation length (e.g., short vs. long). The binary feature corresponding to the conversation length may increase the correlation between the MACS for the conversation determined by annotators based on manual evaluation of the conversation and that predicted by the MACS prediction model 710 during training of the MACS prediction model 710. In some implementations, the feature extractor 704 can also be used to extract features that may be used by the bot state prediction model 706 to more accurately calculate confidence scores for different possible bot states that may be detected within the conversation.

In an embodiment, the features calculated by the feature extractor 704, as well as the conversation data corresponding to a particular calculation, may be used as input to the bot state prediction model 706 to generate confidence scores for different bot states that may be present within the conversation. A confidence score may correspond to a probability that a particular bot state is present within a conversation. In some instances, the bot state prediction model 706 applies a threshold to the confidence scores such that if a confidence score for a particular bot state is above the threshold, the particular bot state is denoted as being present within the conversation. Alternatively, if a confidence score for a particular bot state is not greater than the threshold, the particular bot state is denoted as being absent from the conversation. Thus, the bot state prediction model 706 may either provide confidence scores corresponding to the possible presence of bot states within a conversation or binary indications corresponding to the presence of these bot states to the MACS prediction model 710.

In an embodiment, the bot state machine learning modeling engine 702 can provide the confidence scores corresponding to the possible presence of bot states within a conversation or binary indications corresponding to the presence of these bot states to bot builders 718 without processing of these scores or binary indications through the MACS prediction model 710. For instance, the bot state machine learning modeling engine 702 may provide, via an interface or portal provided by the customer service call center and accessible via a computing device 716 utilized by a bot builder 718, the confidence scores or binary indications corresponding to the presence of different bot states within the conversations in which conversation bot agents 714 implemented by the bot builder 718 are engaged. Based on confidence scores or binary indications, a bot builder 718 may update the configuration of a conversation bot agent 714 to potentially improve the performance (e.g., reduce the likelihood of particular bot states being present, etc.) of the conversation bot agent 714. For instance, if a particular bot state is present (e.g., has a confidence score above a threshold, is indicated as being presented through a binary indication, etc.) for a particular class of conversation bot agents 714, and the particular bot state is undesirable (e.g., bot asks for old information, the bot misunderstands customers, the bot is unable to assist customers, the bot is unable to transfer conversations to live agents, etc.), a bot builder 718 may generate updates to the conversation bot agents 714 to reduce the likelihood of these bot states occurring for these conversation bot agents 714.

In an embodiment, in addition to providing the confidence scores or binary bot state indications to a bot builder 718 for particular conversations, the MACS prediction model 710 can process the output of the bot state prediction model 706 (e.g., confidence scores or binary bot state indications), as well as metrics corresponding to the conversation length, to generate a MACS for the conversation. In some instances, if the MACS prediction model 710 is configured to additionally utilize features to calculate a MACS for the conversation, the MACS prediction model 710 may further obtain these features from the feature extractor 704 or from the bot state prediction model 706. These features may correspond to different characteristics of the conversation, such as the conversation length, instances of previous message repetitions by the conversation bot agent 714, the number of times a customer has re-engaged with a brand after the conversation has been closed, the number of times a customer issue has been escalated, the number of customer requests to transfer the conversation to a human agent, and the like.

The output of the MACS prediction model 710 may include an overall MACS for a particular conversation, as well as a MACS for each message within the conversation. As noted above, a MACS may correspond to a quality of the conversation and performance of a conversation bot agent 714 with regard to a particular conversation. For instance, a MACS of "1" may correspond to a bad conversation where the conversation bot agent 714 was not helpful in addressing a customer's particular issue. Alternatively, a MACS of "5" may indicate that the conversation bot agent 714 was helpful (e.g., provides relevant action or information that pertains to a customer's intent) and the conversation was uneventful, resulting in a positive customer experience. It should be noted that the range of possible MACS values may be determined by the customer service call center to denote possible performance metrics for a conversation bot agent 714 with regard to a particular conversation with a customer. Thus, other MACS ranges may be used in addition to, or as an alternative to, the aforementioned "1-5" range.

In an embodiment, the MACS for a particular conversation and corresponding messages, as well as any identified bot states and corresponding confidence scores/binary indications, can be provided to a bot builder 718 to provide an indication of the performance of a conversation bot agent 714. For instance, the bot state machine learning modeling engine 702 may provide, via an interface or portal provided by the customer service call center and accessible via a computing device 716 utilized by a bot builder 718, the MACS and bot states (along with corresponding confidence scores and/or binary indications) for different conversations in which conversation bot agents 714 implemented by the bot builder 718 are engaged. Based on the resulting MACS, identified bot states, and corresponding confidence scores and/or binary indications for these identified bot states, a bot builder 718 may update the configuration of a conversation bot agent 714 to potentially improve the performance (e.g., MACS, reduced likelihood of unfavorable bot states, etc.) of the conversation bot agent 714. For instance, if the MACS for a particular class of conversation bot agents 714 is consistently below a threshold (e.g., the conversation bot agents 714 are performing poorly) as a result of a particular set of bot states being encountered, a bot builder 718 may generate updates to the conversation bot agents 714 to reduce the likelihood of these bot states occurring and to improve the MACS for these conversation bot agents 714.

In an embodiment, the MACS for a particular conversation, as well as the confidence scores and/or binary indications for different bot states, can be dynamically updated in real-time as new messages from the conversation are processed by the bot state prediction model 706 and the MACS prediction model 710. For instance, rather than processing conversation data from the conversation data store 712 corresponding to completed or terminated conversations, the bot state machine learning modeling engine 702 may process conversations in progress. As an illustrative example, the bot state machine learning modeling engine 702 may monitor ongoing conversations from the conversation data store 712 to detect any new messages added to an ongoing conversation. If the bot state machine learning modeling engine 702 detects one or more new messages within an ongoing conversation, the bot state machine learning modeling engine 702 may process the ongoing conversation, including the one or more new messages, using the bot state prediction model 706 and the MACS prediction model 710 to identify any new bot states (if any) and a new MACS for the ongoing conversation. The new bot states and updated MACS score can be provided to bot builders 718 in real-time to allow bot builders 718 to make modifications or implement updates to a conversation bot agent 714 on the fly, thereby enabling enhancements of conversation bot agents 714 during conversations.

In an embodiment, feedback from bot builders 718 with regard to provided bot states and MACS for conversations in which conversation bot agents 714 engaged with customers or other users can be used to further train the bot state prediction model 706 and the MACS prediction model 710. For instance, a bot builder 718 may evaluate a particular conversation and the indicated bot states and MACS for the conversation to determine whether the indicated bot states and MACS are accurate. For example, if a bot builder 718 determines that a bot state has been incorrectly identified within a conversation, the bot builder 718 may provide an indication to the bot state machine learning modeling engine 702 that a bot state was incorrectly identified by the bot state prediction model 706 for the conversation. In response, the bot state machine learning modeling engine 702 may use this feedback to further train the bot state prediction model 706 and the MACS prediction model 710 in order to improve the accuracy of these models in identifying bot states and calculating MACS for different conversations, respectively.

Figure 8:
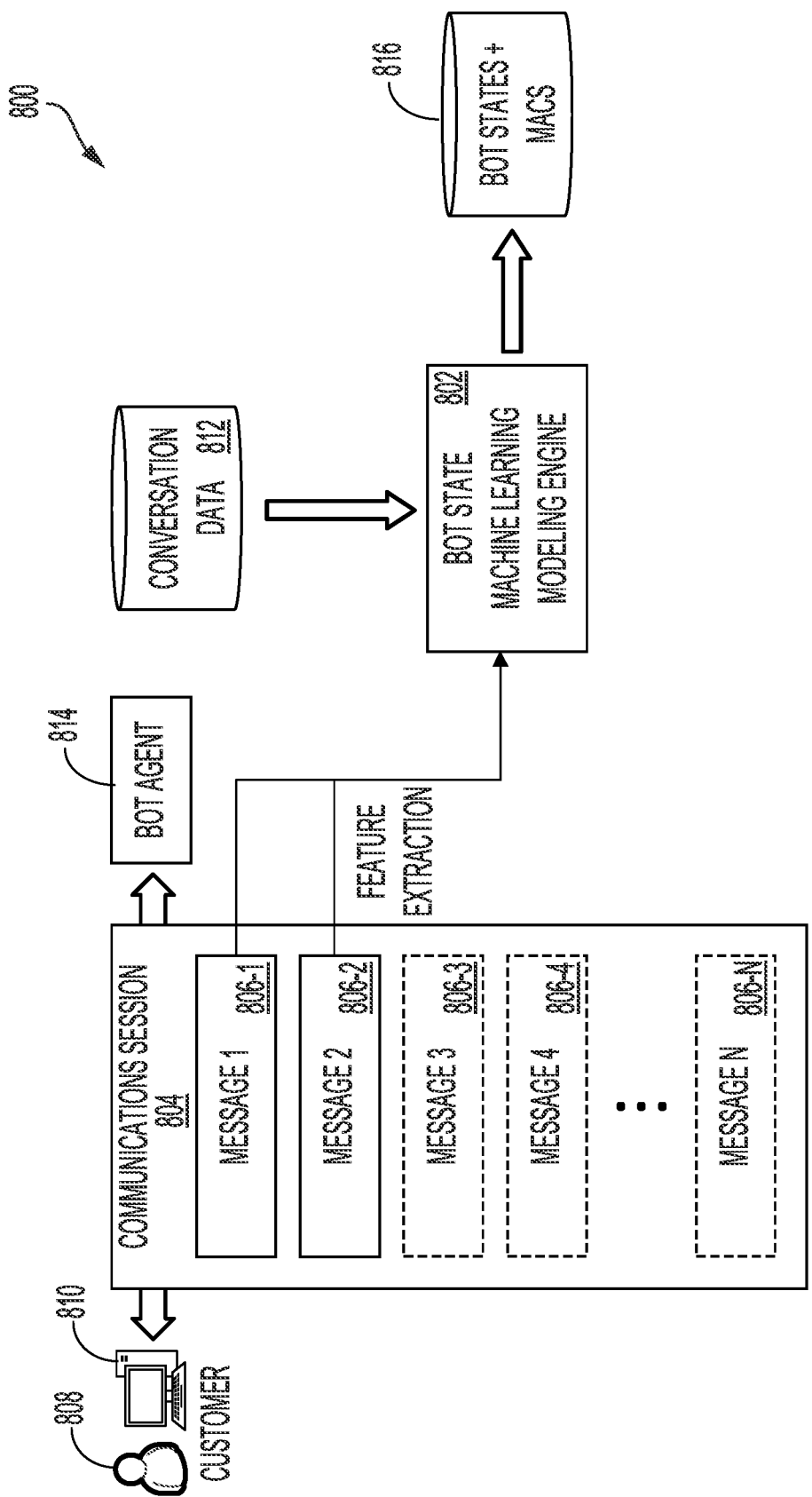
FIG. 8 shows an illustrative example of an environment in which a bot state machine learning modeling engine performs real-time analysis of messages of an active communications session to dynamically determine bot states and a MACS for a conversation bot agent in accordance with at least one embodiment.

FIG. 8 shows an illustrative example of an environment 800 in which a bot state machine learning modeling engine 802 performs real-time analysis of messages 806-1-806-N of an active communications session 804 to dynamically determine bot states and a MACS for a conversation bot agent 814 in accordance with at least one embodiment. In the environment 800, a customer 808, via a computing device 810, may be engaged in a communications session with a conversation bot agent 814 of a customer service call center. Through the communications session 804, the customer 808 and the conversation bot agent 814 may exchange various messages 806-1-806-N over time.

In an embodiment, the customer service call center, which implements the conversation bot agent 814 and other conversation bot agents to autonomously communicate with customers, adds any newly received messages for a communications session 804 in a bus or cache. The customer service call center may implement one or more services that are configured to monitor the bus or cache for any new messages corresponding to the communications session 804 and obtains these new messages for processing. As an illustrated in FIG. 8, messages 806-1 and 806-2 are newly received and are retrieved by these one or more services for feature extraction, as described above. These messages 806-1 and 806-2, as well as the extracted features, are provided to the bot state machine learning modeling engine 802 for processing. As noted above, the bot state machine learning modeling engine 802 may be configured to predict bot states and MACS for a given conversation either via use of distinct models or jointly through use of a joint bot state and MACS prediction model, as illustrated in FIG. 6.

In an embodiment, in addition to using the newly received messages 806-1 and 806-2 and the features extracted from these messages 806-1 and 806-2, the bot state machine learning modeling engine 802 obtains conversation data corresponding to the communications session 804 from a conversation data store 812. This conversation data may include context regarding the communications session 804 that may be used by the bot state machine learning modeling engine 802 to evaluate the newly received messages 806-1 and 806-2 in their proper context. For example, the bot state machine learning modeling engine 802 may retrieve, from the conversation data store 812, any previously exchanged messages between the customer 808 and the conversation bot agent 814 over the duration of the communications session 804. Alternatively, the bot state machine learning modeling engine 802 may obtain metadata for the communications session 804, which may specify attributes of the communications session 804 that may be used to determine the context of the communications session 804. For instance, the metadata may specify a title or label for the communications session 804 (e.g., "customer billing issue," "customer seeking refund," etc.), as well as any data corresponding to the current performance of the conversation bot agent 814. This additional data may include any previously determined bot states and/or MACS for the communications session 804 based on previously exchanged messages.

The bot state machine learning modeling engine 802 may process the newly received messages 806-1 and 806-2, as well as the features extracted from these messages and the context of the communications session 804 from the conversation data store 812, using a bot state and MACS prediction model. As noted above, the bot state and MACS prediction model is trained to detect one or more bot states from a conversation and, based on the detected one or more bot states, calculate a MACS for the conversation. The bot state and MACS prediction model may be trained using features extracted by a feature extractor from sample conversations. For instance, the bot state machine learning modeling engine 802 may utilize the feature extractor to extract the features of a particular conversation. These features may increase the correlation between the MACS determined by annotators (as provided in bot state and MACS annotation data provided by the annotators) based on manual evaluation of the conversation and that predicted by the bot state and MACS prediction model. Further, the bot state and MACS prediction model may be trained using a soft score thresholding engine, which may process bot state and MACS annotation data for the sample conversations to determine probabilities corresponding to the likelihood of bot states being present within a sample conversation. The soft score thresholding engine may compute the probability that a bot state is present for each message within a conversation and the probability that a bot state exists within the particular conversation. These probabilities may be used as input to the model to train the bot state and MACS prediction model.

In an embodiment, the bot state machine learning modeling engine 802 stores the processed messages 806-1 and 806-2, as well as any previously processed messages of the communications session 804 and the determined bot states and MACS for the communications session 804 in a bot state and MACS data store 816. This data store 816 may be implemented as a message bus, whereby subscribers to the message bus (e.g., bot builders, etc.) may evaluate the performance of the conversation bot agent 814 in real-time. For example, when the newly received messages 806-1 and 806-2 are processed to identify any new bot states and to update the MACS for the communications session 804, subscribers to the bot state and MACS data store 816 may be presented with the updated bot states and MACS for the communications session 804 in real-time. This data may also be stored in the conversation data store 812 to provide additional context to the communications session 804 when processing new messages (e.g., messages 806-3-806-N received after the messages 806-1 and 806-2, etc.). Thus, as new messages are exchanged during the communications session 804, the bot state machine learning modeling engine 802 may dynamically update the MACS for the communications session 804 and identify any new bot states in real-time. For instance, as new messages (e.g., messages 806-3-806-N, etc.) are received, the bot state machine learning modeling 802 may dynamically, and in real-time, process these new messages. The bot state machine learning modeling engine 802 may retrieve, from the conversation data store 812, the previously calculated MACS for the communications session 804 and the previously identified bot states. In some instances, the previously calculated MACS for the communications session 804 and the previously identified bot states may be retained in memory such that, as new messages are exchanged via the communications session 804, the bot state machine learning modeling engine 802 may obtain these new messages in real-time and process these new messages to perform a preliminary identification of bot states and a MACS for the communications session 804. The bot state machine learning modeling engine 802 may use this preliminary identification of bot states and MACS along with the previously obtained bot states and MACS to dynamically update the MACS for the communications session 804 and identify any new bot states.

Figure 9:
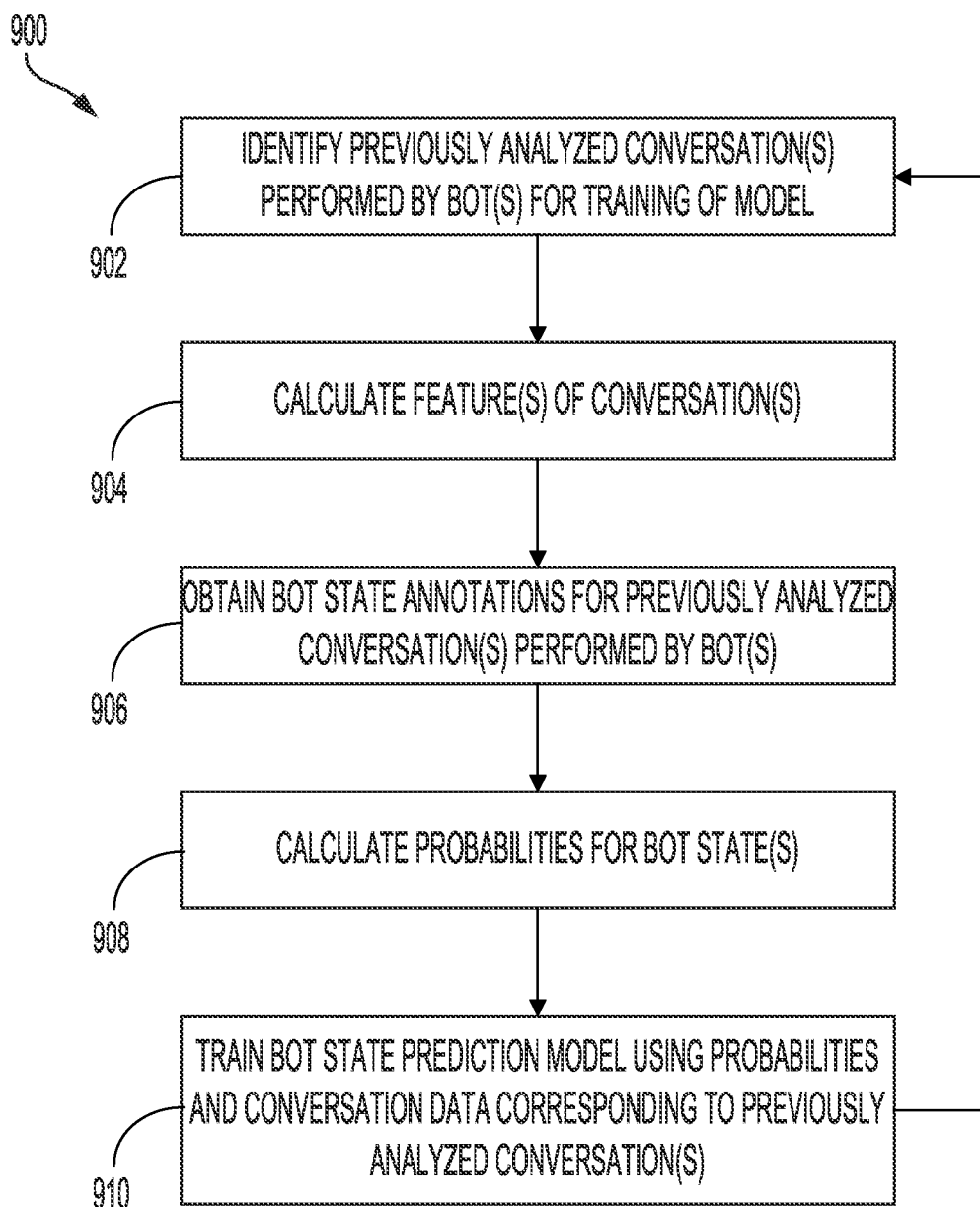
FIG. 9 shows an illustrative example of a process for training a bot state prediction model using conversation data and calculated probabilities for bot states corresponding to previously analyzed bot conversations in accordance with at least one embodiment.

FIG. 9 shows an illustrative example of a process 900 for training a bot state prediction model using conversation data and calculated probabilities for bot states corresponding to previously analyzed bot conversations in accordance with at least one embodiment. The process 900 may be performed by the bot state machine learning modeling engine described above. For instance, the bot state machine learning modeling engine may utilize a feature extractor, as well as a soft score thresholding engine to process sample conversations and annotations made to these sample conversations to train a bot state prediction model.

At step 902, the bot state machine learning modeling engine may identify previously analyzed conversations performed by conversation bot agents (e.g., conversations in which conversation bot agents engaged with customers or other entities over a communications session) for training of the bot state prediction model. For instance, the bot state machine learning modeling engine may identify a set of sample conversations that have been annotated by a set of annotators for training of the bot state prediction model and of a MACS prediction model. As noted above, a particular conversation may be provided to a set of annotators to identify any bot states occurring during the particular conversation. These bot states may include a failure of the bot to understand a customer's message (e.g., intent, issue, etc.), a bot ignoring the customer, a bot being stuck in a message loop, detection of customer frustration with the bot, an erroneous transfer by the bot to a human agent, a bot performing information gathering in order to resolve an intent, a bot successfully providing assistance to a customer, a bot transferring a conversation to a live agent or other bot more capable of handling the intent, a bot checking understanding of a customer response, and the like. In an embodiment, each annotator may evaluate each message of a particular conversation and denote whether a bot state is detected for the message. For example, an annotator may annotate each message of a particular conversation to indicate whether the message is indicative of a particular bot state.

In addition to identifying any previously analyzed conversations for training of the bot state prediction model, the bot state machine learning modeling engine may, at step 904, calculate a set of features of these previously analyzed conversations. For instance, the bot state machine learning modeling engine may utilize a feature extractor to extract the conversation length of a previously analyzed conversation and determine a binary feature indicating if the conversation length is at either extreme in conversation length (e.g., short vs. long). The binary feature corresponding to the conversation length may provide correlations between probabilities of bot states being detected in a sample conversation and the length of the conversation. Thus, this binary feature may be used to further train the bot state prediction model to detect bot states and more accurately calculate the confidence score corresponding to the likelihood of a bot state being present in a given conversation.

At step 906, the bot state machine learning modeling engine may obtain bot state annotations for the previously analyzed conversations performed by the conversation bot agents. As noted above, each sample conversation that is to be used to train the bot state prediction model may be annotated by a set of annotators to indicate the presence (or absence) of particular bot states within the sample conversation. For instance, an annotator may evaluate each message of a conversation and denote whether a bot state has been detected by the annotator, as well as specify which bot state was detected. Thus, from the previously analyzed conversations that are to be used to train the bot state prediction model, the bot state machine learning modeling engine may identify the annotations provided by the set of annotators for the particular conversation and, based on these annotations, identify the bot states detected by each of the annotators.

At step 908, based on the annotations provided by a set of annotators for the previously analyzed conversations, the bot state machine learning modeling engine may calculate probabilities corresponding to the presence of different bot states within the previously analyzed conversations. For instance, the bot state machine learning modeling engine may implement an aggregation strategy to determine the probability that some message within a conversation has a particular bot state. For instance, the bot state machine learning modeling engine may calculate the probability that a bot state is present for each message within a conversation. As an illustrative example, if a particular message has been evaluated by three annotators and one of these annotators has determined that a particular bot state is present for the particular message, the bot state machine learning modeling engine may determine that the probability of the bot state being present in the message is number of annotations indicating the bot state divided by the total number of annotations or, in this case, ⅓. The bot state machine learning modeling engine may subtract this probability from one to obtain a probability that the particular message of the conversion does not include this bot state. The bot state machine learning modeling engine may multiply the probabilities obtained for each message in the particular conversation to obtain the probability of the particular bot state being absent from the particular conversation. The bot state machine learning modeling engine may subtract this probability from one to obtain the probability that the bot state exists within the particular conversation. The resulting annotated conversations and corresponding bot state probabilities may be used as a "ground truth" or sample data set for training of a classification model usable to dynamically detect bot states from conversations in real-time.

At step 910, the bot state machine learning modeling engine may train the bot state prediction model using the aforementioned probabilities and conversation data corresponding to the previously analyzed conversations (e.g., messages, conversation length, features, etc.). For instance, the bot state machine learning modeling engine may use the aforementioned probabilities and conversation data corresponding to the previously analyzed conversations as input to the bot state prediction model. The bot state prediction model may generate, as output, confidence scores corresponding to the likelihood that different bot states are present within a sample conversation.

The output generated by the bot state prediction model (e.g., confidence scores) may be evaluated by annotators or other entities to determine whether the bot state prediction model is generating accurate or correct results. In some instances, the confidence scores generated by the bot state prediction model may be compared to the probabilities of the corresponding bot states being present in the particular conversation to determine whether the bot state prediction model is producing accurate results. For instance, the bot state prediction model used to calculate the confidence score for each possible bot state for a particular conversation may be evaluated to determine, based on the bot state probabilities corresponding to annotator evaluation of the particular conversation from the conversation data, whether the bot state prediction model is correctly identifying any bot states that may be present in the particular conversation. Based on this evaluation, the bot state prediction model may be modified to increase the likelihood of the bot state prediction model generating the desired results.

Once the bot state prediction model has been trained and evaluated, the bot state machine learning modeling engine may repeat the process 900 using any newly obtained conversations and feedback from bot builders and other entities based on their evaluation of these conversations. This allows for continual training of the bot state prediction model in order to ensure that the bot state prediction model is producing accurate results for each conversation in real-time.

Figure 10:
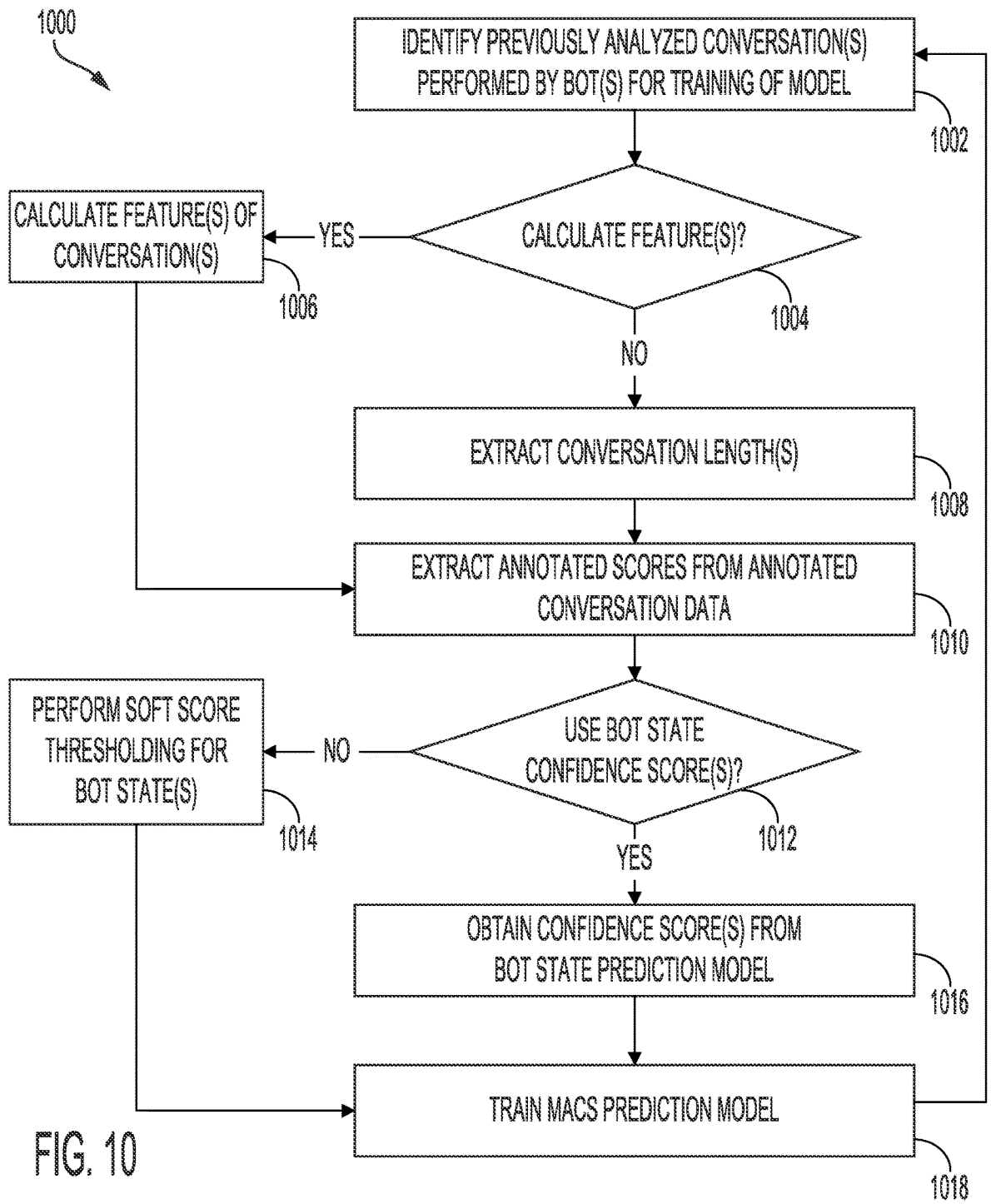
FIG. 10 shows an illustrative example of a process for training a MACS prediction model based on annotated conversation data and identified bot states in accordance with at least one embodiment.

FIG. 10 shows an illustrative example of a process 1000 for training a MACS prediction model based on annotated conversation data and identified bot states in accordance with at least one embodiment. The process 1000 may be performed by the bot state machine learning modeling engine, which may use bot state and MACS annotation data (e.g., data generated by each annotator denoting the bot states detected within sample conversations and the corresponding MACS for the sample conversation), as well as attributes of sample conversations (e.g., conversation length, etc.) for training of the MACS prediction model. As described in greater detail herein, the bot state machine learning modeling engine may also utilize a set of features calculated from the sample conversations and bot state confidence scores generated by a bot state prediction model for training of the MACS prediction model.

At step 1002, the bot state machine learning modeling engine may identify previously analyzed conversations performed by conversation bot agents (e.g., conversations in which conversation bot agents engaged with customers or other entities over a communications session) for training of the bot state prediction model. For instance, the bot state machine learning modeling engine may identify a set of sample conversations that have been annotated by a set of annotators for training of the bot state prediction model and of a MACS prediction model. As noted above, a particular conversation may be provided to a set of annotators to identify any bot states occurring during the particular conversation, as well as the MACS for the particular conversation. Further, as bot states are detected, an annotator may decrement the MACS for the particular conversation until a final MACS for the particular conversation is determined. Thus, a particular sample conversation may be annotated with a progressive MACS that is updated as bot states are detected within a flow of the particular conversation and with a final MACS for the complete conversation.

At step 1004, the bot state machine learning modeling engine may determine whether to calculate a set of features for the previously analyzed conversations for training of the MACS prediction model. As noted above, the bot state machine learning modeling engine may utilize a feature extractor to extract the conversation length of a particular conversation and determine a binary feature indicating if the conversation length is at either extreme in conversation length (e.g., short vs. long). The binary feature corresponding to the conversation length may increase the correlation between the MACS score determined by the annotators based on manual evaluation of the conversation and that predicted by the MACS prediction model. Thus, this binary feature may be used to further improve the training of the MACS prediction model. However, in some instances, the MACS prediction model may be training without features, whereby characteristics of a particular conversation may be extracted and used directly to train the MACS prediction model.

If the bot state machine learning modeling engine is configured to calculate features for use in training of the MACS prediction, the bot state machine learning modeling engine may utilize a feature extractor to calculate the features of the one or more sample conversations at step 1006. Alternatively, if the bot state machine learning modeling engine is configured to train the MACS prediction engine without calculation of features of the sample conversations, the bot state machine learning modeling engine may extract the conversation lengths of the sample conversations using a conversation length extractor at step 1008. The bot state machine learning modeling engine may use these conversation lengths as input to the MACS prediction model, in addition to the annotated MACS and detected bot states for the sample conversations, to train the MACS prediction model, as described herein.

At step 1010, the bot state machine learning modeling engine may extract annotated scores (e.g., MACS) from the annotated conversation data for the one or more previously analyzed conversations. As noted above, the bot state machine learning modeling engine may obtain bot state and MACS annotation data (e.g., data generated by each annotator denoting the bot states detected within a sample conversation and the corresponding MACS for the sample conversation) from annotated data generated by one or more annotators for a set of sample conversations. The bot state machine learning modeling engine may utilize an annotated score extractor to obtain the MACS for each sample conversation from the bot state and MACS annotation data generated by the annotators.

At step 1012, the bot state machine learning modeling engine may determine whether to use bot state confidence scores generated by the bot state prediction model as input to the MACS prediction model for training of the MACS prediction model. As noted above, training of the MACS prediction model and of the bot state prediction model may be performed in parallel, whereby the MACS prediction model does not rely on output from the bot state prediction model for training. However, in some instances, rather than performing training of the MACS prediction model in parallel to the training of the bot state prediction model, the MACS prediction model may be trained using the confidence scores (or bot states detected based on the confidence scores) as input.

If the bot state machine learning modeling engine is configured to perform training of the MACS prediction model in parallel to the training of the bot state prediction model, the bot state machine learning modeling engine, at step 1014, may perform soft score thresholding for the annotated bot states in the previously analyzed conversations. For instance, the MACS for each sample conversation, along with the bot states detected by the annotators, may be provided to a bot state soft score thresholding engine, which may process the MACS for each sample conversation and the corresponding bot states detected in the sample conversation to identify any correlations between bot states and MACS. These correlations, as well as the annotated MACS and detected bot states provided by annotators, may be used as input to the MACS prediction model for training of the MACS prediction model.

If the bot state machine learning modeling engine is configured to utilize confidence scores from the bot state prediction model for training of the MACS prediction model, the bot state machine learning modeling engine, at step 1016, may obtain confidence scores from the bot state prediction model for the previously analyzed conversations. In an embodiment, the bot state machine learning modeling engine can use the confidence score for each bot state obtained using the bot state prediction model for a particular conversation as input to the MACS prediction model to obtain the MACS for the particular conversation. Alternatively, the bot state machine learning modeling engine may determine whether the confidence score for each bot state satisfies a threshold. If a confidence score for a particular bot state is above the threshold, the bot state machine learning modeling engine may determine that the corresponding bot state is present within the conversation. The presence of bot states within a conversation, subject to a threshold, may be used as input to the MACS prediction model to calculate a MACS for the conversation.

At step 1018, the bot state machine learning modeling engine may train the MACS prediction model using the aforementioned data (e.g., conversation lengths, features, annotated MACS, annotated bot states, confidence scores, correlations generated using soft score thresholding, etc.) as input and for evaluation of the performance of the MACS prediction model. As noted above, the output of the MACS prediction model may include a MACS for each sample conversation. The resulting MACS may be evaluated to determine, based on the bot state probabilities corresponding to annotator evaluation of the sample conversations and the MACS annotation for the sample conversations, as obtained from the annotated data, whether the MACS prediction model is correctly calculating the MACS for the particular conversation. Based on this evaluation, the MACS prediction model may be modified to increase the likelihood of the MACS prediction model generating the desired results.

Similar to the continuous training of the bot state prediction model described above in connection with FIG. 9, training of the MACS may be continuously performed to improve the accuracy of the MACS prediction model. For instance, the bot state machine learning modeling engine may repeat the process 1000 using any newly obtained conversations and feedback from bot builders and other entities based on their evaluation of these conversations. This allows for continual training of the MACS prediction model in order to ensure that the MACS prediction model is producing accurate results for each conversation in real-time.

Figure 11:
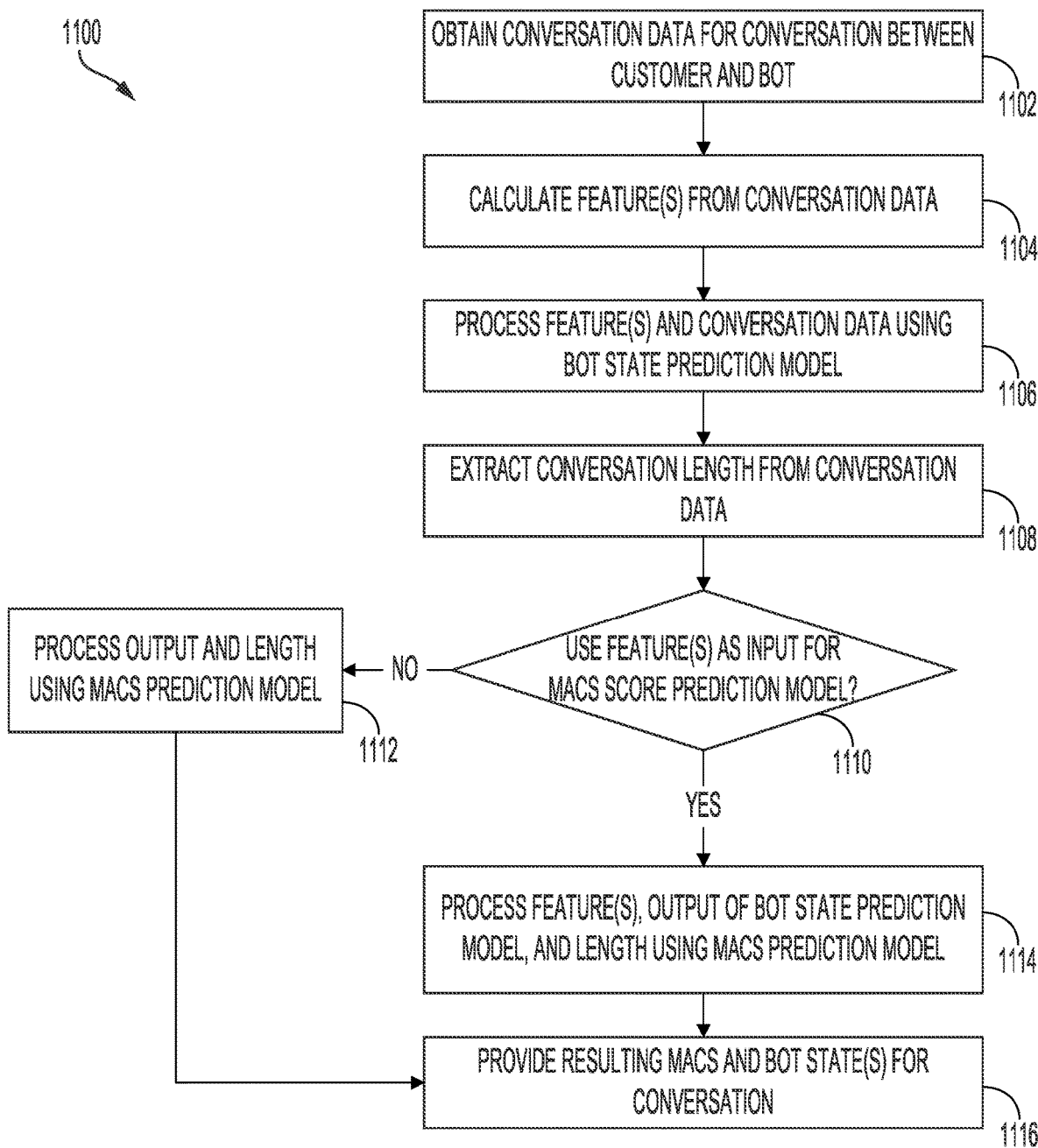
FIG. 11 shows an illustrative example of a process for generating and providing MACS and any bot states for a conversation between a bot agent and a customer in accordance with at least one embodiment.

FIG. 11 shows an illustrative example of a process 1100 for generating and providing MACS and any bot states for a conversation between a bot agent and a customer in accordance with at least one embodiment. The process 1100 may be performed by a customer service call center or other entity that implements a bot state prediction model and MACS prediction model for detection of bot states and calculation of MACS for conversations between conversation bot agents and customers, respectively. At step 1102, a customer service call center or other entity may obtain conversation data for a particular conversation between a customer and a conversation bot agent. For instance, conversations between conversation bot agents and customers and other users of the customer service call center may be recorded. A recorded conversation may include any messages communicated between a particular conversation bot agent and a customer or other entity over a communications session established between the conversation bot agent and a computing device of the customer or other entity.

At step 1104, the customer service call center or other entity may calculate a set of features of the conversation from the conversation data. For instance, the conversation data for a particular conversation between a conversation bot agent and a customer or other user over a communications session may be used as input to a feature extractor. As noted above, a feature extractor may be used to calculate the conversation length of a particular conversation and determine a binary feature indicating if the conversation length is at either extreme in conversation length (e.g., short vs. long). The binary feature corresponding to the conversation length may increase the correlation between the MACS for the conversation determined by annotators based on manual evaluation of the conversation and that predicted by the MACS prediction model during training of the MACS prediction model. In some implementations, the feature extractor can also be used to extract features that may be used by the bot state prediction model to more accurately calculate confidence scores for different possible bot states that may be detected within the conversation.

At step 1106, the customer service call center or other entity may process the set of features and the conversation data corresponding to the particular conversation using a bot state prediction model. As noted above, the features calculated by the feature extractor, as well as the conversation data corresponding to a particular calculation, may be used as input to the bot state prediction model to generate confidence scores for different bot states that may be present within the conversation. In some instances, the bot state prediction model may apply a threshold to the confidence scores such that if a confidence score for a particular bot state is above the threshold, the particular bot state is denoted as being present within the conversation. Alternatively, if a confidence score for a particular bot state is not greater than the threshold, the particular bot state is denoted as being absent from the conversation. Thus, the bot state prediction model may either provide confidence scores corresponding to the possible presence of bot states within a conversation or binary indications corresponding to the presence of these bot states to the MACS prediction model.

At step 1108, the customer service call center or other entity may extract the conversation length from the conversation data. The customer service call center or other entity may use a conversation length extractor to determine the length of the conversation for which a MACS is being determined. The length of a conversation may be determined as the number of messages exchanged between a conversation bot agent and a customer or other user during a communications session between the conversation bot agent and the customer or other user. Alternatively, the conversation length may be defined as the number of messages transmitted by a conversation bot agent during a communications session with a customer or other user.

At step 1110, the customer service call center or other entity may determine whether to use the set of features as input to the MACS prediction model to obtain the MACS for the conversation. As noted above, the MACS prediction model may be configured to process the output of the bot state prediction model (e.g., confidence scores or binary bot state indications), as well as metrics corresponding to the conversation length, to generate a MACS for the conversation. In some instances, if the MACS prediction model is configured to additionally utilize features to calculate a MACS for the conversation, the customer service call center or other entity, at step 1114, may process these features, as well as the output of the bot state prediction model, the conversation length, and the conversation data itself using the MACS prediction model. Alternatively, if the MACS prediction model is configured to utilize the output of the bot state prediction model and the conversation length as input, the customer service call center or other entity, at step 1112, may process these using the MACS prediction model.

At step 1116, the customer service call center or other entity provides the resulting MACS and detected bot states for the conversation. For instance, the customer service call center or other entity may provide, via an interface or portal provided by the customer service call center and accessible via a computing device utilized by a bot builder, the MACS and bot states for the conversation in which a conversation bot agent implemented by the bot builder is engaged. Based on the resulting MACS and identified bot states, a bot builder may update the configuration of a conversation bot agent to potentially improve the performance (e.g., MACS, etc.) of the conversation bot agent. For instance, if the MACS for a particular class of conversation bot agents is consistently below a threshold (e.g., the conversation bot agents are performing poorly) as a result of a particular set of bot states being encountered, a bot builder may generate updates to the conversation bot agents to reduce the likelihood of these bot states occurring and to improve the MACS for these conversation bot agents.

Figure 12:
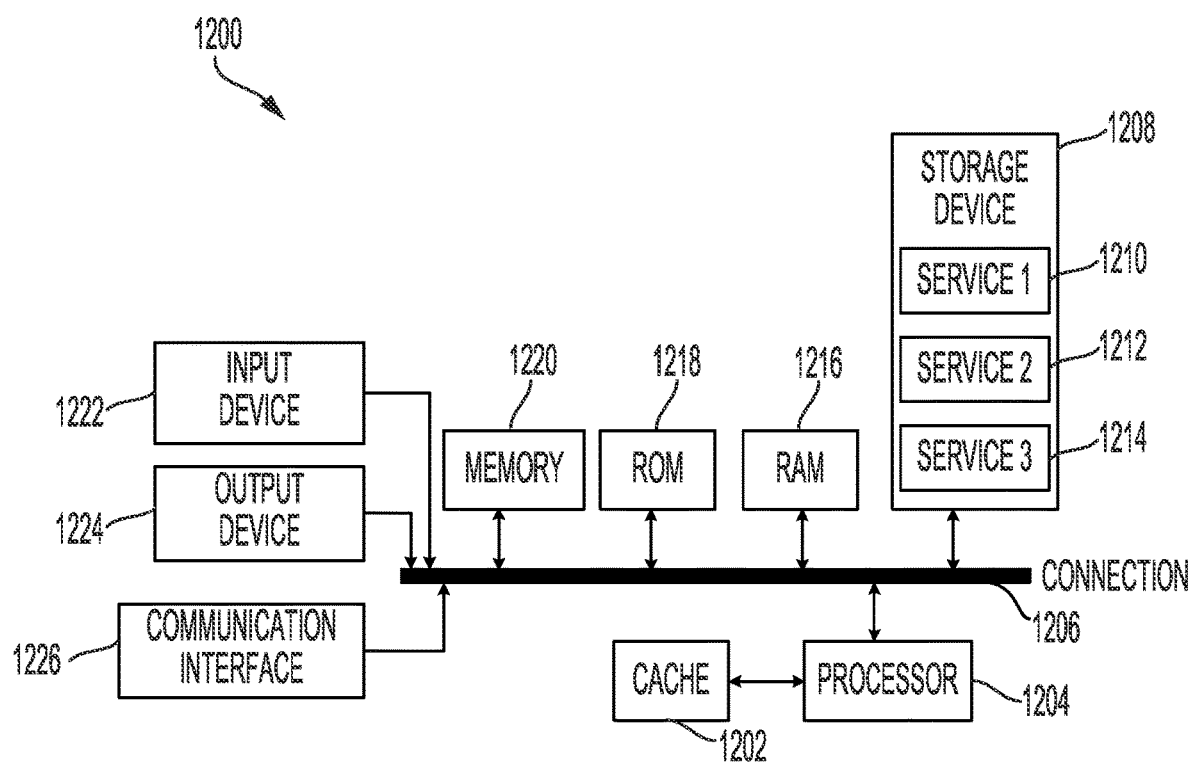
FIG. 12 shows an illustrative example of an environment in which various embodiments can be implemented.

FIG. 12 illustrates a computing system architecture 1200 including various components in electrical communication with each other using a connection 1206, such as a bus, in accordance with some implementations. Example system architecture 1200 includes a processing unit (CPU or processor) 1204 and a system connection 1206 that couples various system components including the system memory 1220, such as ROM 1218 and RAM 1216, to the processor 1204. The system architecture 1200 can include a cache 1202 of high-speed memory connected directly with, in close proximity to, or integrated as part of the processor 1204. The system architecture 1200 can copy data from the memory 1220 and/or the storage device 1208 to the cache 1202 for quick access by the processor 1204. In this way, the cache can provide a performance boost that avoids processor 1204 delays while waiting for data. These and other modules can control or be configured to control the processor 1204 to perform various actions.

Other system memory 1220 may be available for use as well. The memory 1220 can include multiple different types of memory with different performance characteristics. The processor 1204 can include any general purpose processor and a hardware or software service, such as service 1 1210, service 2 1212, and service 3 1214 stored in storage device 1208, configured to control the processor 1204 as well as a special-purpose processor where software instructions are incorporated into the actual processor design. The processor 1204 may be a completely self-contained computing system, containing multiple cores or processors, a bus, memory controller, cache, etc. A multi-core processor may be symmetric or asymmetric.

To enable user interaction with the computing system architecture 1200, an input device 1222 can represent any number of input mechanisms, such as a microphone for speech, a touch-sensitive screen for gesture or graphical input, keyboard, mouse, motion input, speech and so forth. An output device 1224 can also be one or more of a number of output mechanisms known to those of skill in the art. In some instances, multimodal systems can enable a user to provide multiple types of input to communicate with the computing system architecture 1200. The communications interface 1226 can generally govern and manage the user input and system output. There is no restriction on operating on any particular hardware arrangement and therefore the basic features here may easily be substituted for improved hardware or firmware arrangements as they are developed.

Storage device 1208 is a non-volatile memory and can be a hard disk or other types of computer readable media which can store data that are accessible by a computer, such as magnetic cassettes, flash memory cards, solid state memory devices, digital versatile disks, cartridges, RAMs 1216, ROM 1218, and hybrids thereof.

The storage device 1208 can include services 1210, 1212, 1214 for controlling the processor 1204. Other hardware or software modules are contemplated. The storage device 1208 can be connected to the system connection 1206. In one aspect, a hardware module that performs a particular function can include the software component stored in a computer-readable medium in connection with the necessary hardware components, such as the processor 1204, connection 1206, output device 1224, and so forth, to carry out the function.

The disclosed methods can be performed using a computing system. An example computing system can include a processor (e.g., a central processing unit), memory, non-volatile memory, and an interface device. The memory may store data and/or and one or more code sets, software, scripts, etc. The components of the computer system can be coupled together via a bus or through some other known or convenient device. The processor may be configured to carry out all or part of methods described herein for example by executing code for example stored in memory. One or more of a user device or computer, a provider server or system, or a suspended database update system may include the components of the computing system or variations on such a system.

This disclosure contemplates the computer system taking any suitable physical form, including, but not limited to a Point-of-Sale system ("POS"). As example and not by way of limitation, the computer system may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computer system may include one or more computer systems; be unitary or distributed; span multiple locations; span multiple machines; and/or reside in a cloud, which may include one or more cloud components in one or more networks. Where appropriate, one or more computer systems may perform without substantial spatial or temporal limitation one or more steps of one or more methods described or illustrated herein. As an example and not by way of limitation, one or more computer systems may perform in real time or in batch mode one or more steps of one or more methods described or illustrated herein. One or more computer systems may perform at different times or at different locations one or more steps of one or more methods described or illustrated herein, where appropriate.

The processor may be, for example, be a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory can be coupled to the processor by, for example, a bus. The memory can include, by way of example but not limitation, random access memory (RAM), such as dynamic RAM (DRAM) and static RAM (SRAM). The memory can be local, remote, or distributed.

The bus can also couple the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software can be stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory herein. Even when software is moved to the memory for execution, the processor can make use of hardware registers to store values associated with the software, and local cache that, ideally, serves to speed up execution. As used herein, a software program is assumed to be stored at any known or convenient location (from non-volatile storage to hardware registers), when the software program is referred to as "implemented in a computer-readable medium." A processor is considered to be "configured to execute a program" when at least one value associated with the program is stored in a register readable by the processor.

The bus can also couple the processor to the network interface device. The interface can include one or more of a modem or network interface. It will be appreciated that a modem or network interface can be considered to be part of the computer system. The interface can include an analog modem, Integrated Services Digital network (ISDN0 modem, cable modem, token ring interface, satellite transmission interface (e.g., "direct PC"), or other interfaces for coupling a computer system to other computer systems. The interface can include one or more input and/or output (I/O) devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device.

In operation, the computer system can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system and its associated file management system. The file management system can be stored in the non-volatile memory and/or drive unit and can cause the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some examples. The required structure for a variety of these systems will appear from the description below. In addition, the techniques are not described with reference to any particular programming language, and various examples may thus be implemented using a variety of programming languages.

In various implementations, the system operates as a standalone device or may be connected (e.g., networked) to other systems. In a networked deployment, the system may operate in the capacity of a server or a client system in a client-server network environment, or as a peer system in a peer-to-peer (or distributed) network environment.

The system may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any system capable of executing a set of instructions (sequential or otherwise) that specify actions to be taken by that system.

While the machine-readable medium or machine-readable storage medium is shown, by way of example, to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding, or carrying a set of instructions for execution by the system and that cause the system to perform any one or more of the methodologies or modules of disclosed herein.

In general, the routines executed to implement the implementations of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while examples have been described in the context of fully functioning computers and computer systems, those skilled in the art will appreciate that the various examples are capable of being distributed as a program object in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting the subject matter to the precise forms disclosed. Persons skilled in the relevant art can appreciate that many modifications and variations are possible in light of the above disclosure. Numerous specific details are described to provide a thorough understanding of the disclosure. However, in certain instances, well-known or conventional details are not described in order to avoid obscuring the description.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of the items in the list.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative implementations may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various examples described above can be combined to provide further examples.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further examples of the disclosure.

These and other changes can be made to the disclosure in light of the above Detailed Description. While the above description describes certain examples, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 35 U.S.C. § 112(f) will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various examples given in this specification.

Without intent to further limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe examples in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module is implemented with a computer program object comprising a computer-readable medium containing computer program code, which can be executed by a computer processor for performing any or all of the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples may also relate to an object that is produced by a computing process described herein. Such an object may comprise information resulting from a computing process, where the information is stored on a non-transitory, tangible computer readable storage medium and may include any implementation of a computer program object or other data combination described herein.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

Specific details were given in the preceding description to provide a thorough understanding of various implementations of systems and components for a contextual connection system. It will be understood by one of ordinary skill in the art, however, that the implementations described above may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

It is also noted that individual implementations may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Client devices, network devices, and other devices can be computing systems that include one or more integrated circuits, input devices, output devices, data storage devices, and/or network interfaces, among other things. The integrated circuits can include, for example, one or more processors, volatile memory, and/or non-volatile memory, among other things. The input devices can include, for example, a keyboard, a mouse, a key pad, a touch interface, a microphone, a camera, and/or other types of input devices. The output devices can include, for example, a display screen, a speaker, a haptic feedback system, a printer, and/or other types of output devices. A data storage device, such as a hard drive or flash memory, can enable the computing device to temporarily or permanently store data. A network interface, such as a wireless or wired interface, can enable the computing device to communicate with a network. Examples of computing devices include desktop computers, laptop computers, server computers, hand-held computers, tablets, smart phones, personal digital assistants, digital home assistants, as well as machines and apparatuses in which a computing device has been incorporated.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

The various examples discussed above may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable storage medium (e.g., a medium for storing program code or code segments). A processor(s), implemented in an integrated circuit, may perform the necessary tasks.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the implementations disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for implementing a suspended database update system.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A computer-implemented method comprising:
   receiving conversation data corresponding to a conversation between a conversation bot agent and a customer, wherein the conversation data includes messages exchanged between the conversation bot agent and the customer;
   calculating a set of features from the conversation data;
   detecting a set of bot states corresponding to performance of the conversation bot agent in the conversation, wherein the set of bot states is detected based on the set of features and the conversation data;
   training a machine learning model using sample conversation data and corresponding bot states, wherein training includes determining a Meaningful Automated Connection Score (MACS) for conversations;
   providing a MACS for the conversation and the set of bot states;
   receiving an update to the conversation bot agent;
   implementing the update to the conversation bot agent, wherein the update is used to train the machine learning model;
   receiving a new message associated with the conversation;
   generating a determination as to whether a new bot state is present within the new message;
   dynamically updating the MACS for the conversation based on the determination, the conversation data, and the new message; and
   providing the updated MACS.

2. The computer-implemented method of claim 1, further comprising:
   training a bot state machine learning model using the sample conversation data and annotations made to the sample conversation data, wherein training includes determining bot states for conversations; and
   using the bot state machine learning model to detect the set of bot states.

3. The computer-implemented method of claim 1, further comprising:
   calculating confidence scores corresponding to a set of possible bot states, wherein the confidence scores are calculated based on the set of features and the conversation data;
   applying a threshold to the confidence scores, wherein bot states are detected as a result of corresponding confidence scores being greater than the threshold.

4. The computer-implemented method of claim 1, further comprising:
   extracting conversation lengths corresponding to the sample conversation data; and
   using the conversation lengths to further train the machine learning model, wherein the machine learning model is further trained to identify correlations between conversation lengths and the MACS for the conversations.

5. The computer-implemented method of claim 1, wherein the machine learning model is further trained based on confidence scores corresponding to presence of bot states in the sample conversation data, wherein the confidence scores are obtained from a bot state machine learning model.

6. The computer-implemented method of claim 1, wherein the machine learning model is further trained using a set of features extracted from the sample conversation data.

7. The computer-implemented method of claim 1, further comprising:
   transferring the conversation from the conversation bot agent to a live agent, wherein the conversation is transferred as a result of updated MACS falling below a threshold value.

8. A system, comprising:
   one or more processors; and
   memory storing thereon instructions that, as a result of being executed by the one or more processors, cause the system to:
   receive conversation data corresponding to a conversation between a conversation bot agent and a customer, wherein the conversation data includes messages exchanged between the conversation bot agent and the customer;
   calculate a set of features from the conversation data;
   detect a set of bot states corresponding to performance of the conversation bot agent in the conversation, wherein the set of bot states is detected based on the set of features and the conversation data;
   train a machine learning model using sample conversation data and corresponding bot states, wherein training includes determining a Meaningful Automated Connection Score (MACS) for conversations;
   provide a MACS for the conversation and the set of bot states;
   receive an update to the conversation bot agent; and
   implement the update to the conversation bot agent, wherein the update is used to train the machine learning model;
   receive a new message associated with the conversation;
   generate a determination as to whether a new bot state is present within the new message;
   dynamically update the MACS for the conversation, wherein the MACS is updated based on the determination, the conversation data, and the new message; and
   provide the updated MACS.

9. The system of claim 8, wherein the instructions that cause the system to detect the set of bot states further cause the system to:
   train a bot state machine learning model using the sample conversation data and annotations made to the sample conversation data, wherein training includes determining bot states for conversations; and use the bot state machine learning model to detect the set of bot states.

10. The system of claim 9, wherein the instructions further cause the system to:
transfer the conversation from the conversation bot agent to a live agent, wherein the conversation is transferred as a result of updated MACS falling below a threshold value.

11. The system of claim 8, wherein the instructions that cause the system to detect the set of bot states further cause the system to:
calculate confidence scores corresponding to a set of possible bot states, wherein the confidence scores are calculated based on the set of features and the conversation data; and
apply a threshold to the confidence scores, wherein bot states are detected as a result of corresponding confidence scores being greater than the threshold.

12. The system of claim 8, wherein the instructions further cause the system to:
extract conversation lengths corresponding to the sample conversation data; and
use the conversation lengths to further train the machine learning model, wherein the machine learning model is further trained to identify correlations between conversation lengths and the MACS for the conversations.

13. The system of claim 8, wherein the machine learning model is further trained based on confidence scores corresponding to presence of bot states in the sample conversation data, wherein the confidence scores are obtained from a bot state machine learning model.

14. The system of claim 8, wherein the machine learning model is further trained using a set of features extracted from the sample conversation data.

15. A non-transitory, computer-readable storage medium storing thereon executable instructions that, as a result of being executed by one or more processors of a computer system, cause the computer system to:
receive conversation data corresponding to a conversation between a conversation bot agent and a customer, wherein the conversation data includes messages exchanged between the conversation bot agent and the customer;
calculate a set of features from the conversation data;
detect a set of bot states corresponding to performance of the conversation bot agent in the conversation, wherein the set of bot states is detected based on the set of features and the conversation data;
train a machine learning model using sample conversation data and corresponding bot states, wherein training includes determining a Meaningful Automated Connection Score (MACS) for conversations;
provide a MACS for the conversation and the set of bot states;
receive an update to the conversation bot agent; and
implement the update to the conversation bot agent, wherein the update is used to train the machine learning model;
receive a new message associated with the conversation;
generate a determination as to whether a new bot state is present within the new message;
dynamically update the MACS for the conversation, wherein the MACS is updated based on the determination, the conversation data, and the new message; and
provide the updated MACS.

16. The non-transitory, computer-readable medium of claim 15, wherein the executable instructions that cause the computer system to detect the set of bot states further cause the computer system to:
train a bot state machine learning model using the sample conversation data and annotations made to the sample conversation data, wherein training includes determining bot states for conversations; and
use the bot state machine learning model to detect the set of bot states.

17. The non-transitory, computer-readable medium of claim 15, wherein the executable instructions that cause the computer system to detect the set of bot states further cause the computer system to:
calculate confidence scores corresponding to a set of possible bot states, wherein the confidence scores are calculated based on the set of features and the conversation data; and
apply a threshold to the confidence scores, wherein bot states are detected as a result of corresponding confidence scores being greater than the threshold.

18. The non-transitory, computer-readable medium of claim 15, wherein the executable instructions further cause the computer system to:
extract conversation lengths corresponding to the sample conversation data; and
use the conversation lengths to further train the machine learning model, wherein the machine learning model is further trained to identify correlations between conversation lengths and the MACS for the conversations.

19. The non-transitory, computer-readable medium of claim 15, wherein the machine learning model is further trained based on confidence scores corresponding to presence of bot states in the sample conversation data, wherein the confidence scores are obtained from a bot state machine learning model.

20. The non-transitory, computer-readable storage medium of claim 15, wherein the machine learning model is further trained using a set of features extracted from the sample conversation data.

21. The non-transitory, computer-readable medium of claim 15, wherein the executable instructions further cause the computer system to:
transfer the conversation from the conversation bot agent to a live agent, wherein the conversation is transferred as a result of updated MACS falling below a threshold value.

* * * * *